(12) United States Patent
Ishida et al.

(10) Patent No.: US 8,507,689 B2
(45) Date of Patent: Aug. 13, 2013

(54) ORGANIC SALT COMPOUND, AND OPTICAL RECORDING MATERIAL AND OPTICAL RECORDING MEDIUM USING THE ORGANIC SALT COMPOUND

(75) Inventors: Tatsuya Ishida, Tokyo (JP); Satoshi Yanagisawa, Tokyo (JP)

(73) Assignee: Adeka Corporation, Tokyo (JP)

( * ) Notice: Subject to any disclaimer, the term of this patent is extended or adjusted under 35 U.S.C. 154(b) by 48 days.

(21) Appl. No.: 13/258,855

(22) PCT Filed: Apr. 22, 2010

(86) PCT No.: PCT/JP2010/057161
§ 371 (c)(1),
(2), (4) Date: Sep. 22, 2011

(87) PCT Pub. No.: WO2010/137432
PCT Pub. Date: Dec. 2, 2010

(65) Prior Publication Data
US 2012/0016134 A1 Jan. 19, 2012

(30) Foreign Application Priority Data
May 28, 2009 (JP) .................................. 2009-129456

(51) Int. Cl.
C07F 13/00 (2006.01)
C07F 15/02 (2006.01)
C07F 15/04 (2006.01)
C07F 15/06 (2006.01)

(52) U.S. Cl.
USPC .......................................................... 548/107

(58) Field of Classification Search
USPC .......................................................... 548/107
See application file for complete search history.

(56) References Cited

U.S. PATENT DOCUMENTS

| | | | | |
|---|---|---|---|---|
| 6,683,188 B1 * | 1/2004 | Kasada et al. | ................. | 548/181 |
| 2009/0054652 A1 | 2/2009 | Yano et al. | | |
| 2010/0003445 A1 | 1/2010 | Yano et al. | | |

FOREIGN PATENT DOCUMENTS

| | | |
|---|---|---|
| JP | 07-085499 | 3/1995 |
| JP | 07-262604 | 10/1995 |
| JP | 2001-301333 | 10/2001 |
| JP | 2004-174838 | 6/2004 |
| JP | 2005-059601 | 3/2005 |
| JP | 2005-305839 | 11/2005 |
| JP | 2007-090768 | 4/2007 |
| JP | 2007-112066 | 5/2007 |
| JP | 2007-207324 | 8/2007 |
| JP | 2008-024655 | 2/2008 |
| WO | WO 2007/114073 | 10/2007 |
| WO | WO 2008/123404 | 10/2008 |

OTHER PUBLICATIONS

International Search Report, PCT/JP2010/057161, Jul. 6, 2010.
Chinese Office Action dated Feb. 6, 2013 in corresponding Chinese Patent Application No. 201080010598.2 with English translation of Chinese Office Action.

* cited by examiner

Primary Examiner — Joseph Kosack
Assistant Examiner — Matthew Coughlin
(74) Attorney, Agent, or Firm — Young & Thompson

(57) ABSTRACT

Compounds of the class of organic salts based on monomethine cyanine cation and azomethine complex cation are useful to promote light sensitivity and light resistance in laser writable and readable recording material. The compounds of Formula (I) and (IV) are exemplified in Formula (I) with X being oxygen, sulfur, or selenium; $R^1$ and $R^2$ are each C1-C20 alkyl, C7-C30 arylalkyl; $R^3$ to $R^6$ are each hydrogen, C1-C20 alkyl, etc.; $R^4$ and $R^5$ may be taken together to form a 6-membered ring; $Y^1$ and $Y^2$ are each C1-C20 alkyl; $R^7$ to $R^{10}$ are each hydrogen, C1-C20 alkyl, etc.; and adjacent two of $R^7$ to $R^{10}$ may be taken together to form a 5- or 6-membered ring. In Formula (IV) M' is Fe, Co, Ni, Cr or Mn; and $R^{11}$ to $R^{26}$ are each hydrogen, nitro, —NRR' (R and R' are each C1-C4 alkyl).

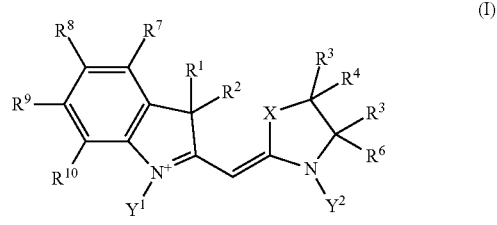

(I)

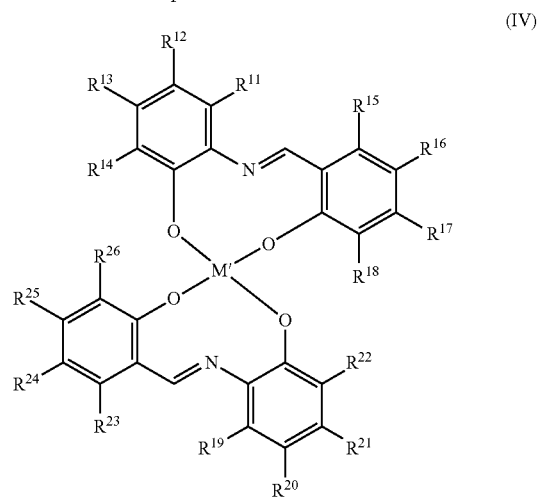

(IV)

3 Claims, No Drawings

ORGANIC SALT COMPOUND, AND OPTICAL RECORDING MATERIAL AND OPTICAL RECORDING MEDIUM USING THE ORGANIC SALT COMPOUND

TECHNICAL FIELD

This invention relates to a novel organic salt compound composed of a monomethine cyanine cation and an azomethine complex anion. The organic salt compound is useful as an optical element and the like, particularly as an optical recording agent to be incorporated in an optical recording material used to form an optical recording layer of an optical recording medium writable and readable with laser light.

BACKGROUND ART

Wavelengths of semiconductor laser beams used in writing and reading information on optical recording media are in the ranges of 750 to 830 nm for CD-Rs and of 620 to 690 nm for DVD-Rs. In pursuit of a further increased capacity, optical discs using shorter wavelength lasers have been under study. For example, those using a write wavelength of 380 to 420 nm have been studied.

Various kinds of compounds are used to form an optical recording layer of optical recording media for shorter wavelength recording. For example, patent literatures 1 and 2 report trimethine cyanine dyes, and patent literature 3 reports asymmetric trimethine cyanine dyes. However, these compounds contain an inorganic anion and have the problem of poor light resistance.

Patent literature 4 discloses a metal complex having triazole as a ligand. Patent literature 5 describes a dye having a porphyrin skeleton. Patent literature 6 reports an optical recording material and an optical recording medium containing a trimethine cyanine dye and an azomethine complex. However, these compounds are used as they carry an inorganic counter ion and can cause precipitation of a salt, such as $Na^+PF_6^-$.

Patent literature 7 discloses a triethylamine salt of an azomethine complex, which turned out to have insufficient sensitivity to 380 to 420 nm.

Patent literature 8 discloses a salt between a trimethine cyanine dye and an azomethine complex. However, there is no report about a compound that exhibits both absorption in the range of from 380 to 420 nm and sufficient decomposition behavior.

CITATION LIST

Patent Literature

Patent literature 1: JP 07-085499A
Patent literature 2: JP 07-262604A
Patent literature 3: JP 2001-301333A
Patent literature 4: JP 2004-174838A
Patent literature 5: JP 2005-59601A
Patent literature 6: JP 2005-305839A
Patent literature 7: JP 2007-112066A
Patent literature 8: JP 2007-207324A

SUMMARY OF INVENTION

Technical Problem

An object of the invention is to provide a compound excellent in sensitivity and light resistance and suitable as an optical element for use in an optical recording material for writing/reading information using laser light.

Solution to Problem

As a result of extensive investigation, the inventors of the present invention have found that an organic salt compound having a specific structure is excellent in sensitivity and light resistance and that use of the compound provides a solution to the above problem.

Based on that finding, the invention provides an organic salt compound composed of a monomethine cyanine cation represented by formula (I) shown below (hereinafter "monomethine cyanine cation (I)") and an azomethine complex anion represented by formula (IV) shown below (hereinafter "azomethine complex anion (IV)"):

[Chem. 1]

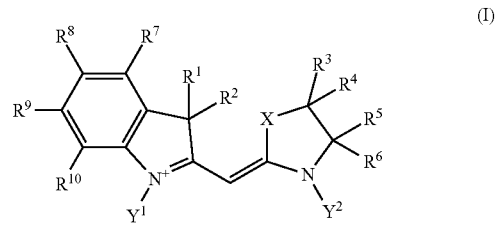

(I)

wherein X represents an oxygen atom, sulfur atom, a selenium atom, or $-NY^3-$;

$R^1$ and $R^2$ each independently represent a group represented by formula (II) shown below, a group represented by formula (II') shown below, an alkyl group having 1 to 20 carbon atoms, an aryl group having 6 to 30 carbon atoms, or an arylalkyl group having 7 to 30 carbon atoms, and $R^1$ and $R^2$ may be taken together to form a 3- to 6-membered alicyclic group;

$R^3$, $R^4$, $R^5$, and $R^6$ each independently represent a hydrogen atom, an alkyl group having 1 to 20 carbon atoms, an aryl group having 6 to 30 carbon atoms, or an arylalkyl group having 7 to 30 carbon atoms, and $R^4$ and $R^5$ may be taken together to form a 6-membered ring;

$Y^1$, $Y^2$, and $Y^3$ each independently represent an alkyl group having 1 to 20 carbon atoms, an aryl group having 6 to 30 carbon atoms, or an arylalkyl group having 7 to 30 carbon atoms, or a group represented by formula (III) shown below;

$R^7$, $R^8$, $R^9$, and $R^{10}$ each independently represent a hydrogen atom, a hydroxyl group, an alkyl group having 1 to 20 carbon atoms, an aryl group having 6 to 30 carbon atoms, an arylalkyl group having 7 to 30 carbon atoms, a halogen atom, a nitro group, or a cyano group, and adjacent two of $R^7$, $R^8$, $R^9$, and $R^{10}$ may be taken together to form a 5- or 6-membered ring; and the methylene moiety of the alkyl group and the arylalkyl group may be interrupted by $-O-$, $-S-$, $-CO-$, $-COO-$, $-OCO-$, $-SO_2-$, $-NH-$, $-CONH-$, $-NHCO-$, $-N=CH-$, or $-CH=CH-$;

[Chem. 2]

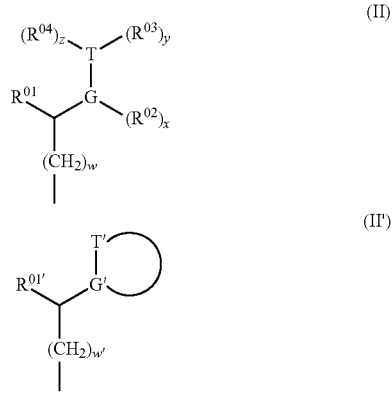

wherein, in formula (II), the bond between G and T is a double bond, a conjugated double bond, or a triple bond; G represents a carbon atom; T represents a carbon atom, an oxygen atom, or a nitrogen atom; w represents a number from 0 to 4; x, y, and z each represent 0 or 1, provided that, when T is oxygen, y=z=0, and, when T is nitrogen, y+z=0 or 1; $R^{01}$, $R^{02}$, $R^{03}$ and $R^{04}$ each independently represent a hydrogen atom, a hydroxyl group, a nitro group, a cyano group, a halogen atom, or an optionally substituted alkyl group having 1 to 4 carbon atoms of which the methylene moiety may be interrupted by —O— or —CO—; and $R^{01}$ and $R^{04}$ may be taken together to form a cycloalkene ring or a heterocyclic ring; and in formula (II'), the bond between G' and T' is a double bond or a conjugated double bond; G' represents a carbon atom; T' represents a carbon atom or a nitrogen atom; w' represents a number of 0 to 4; $R^{01'}$ represented a hydrogen atom, a hydroxyl group, a nitro group, a cyano group, a halogen atom, an optionally substituted alkyl group having 1 to 4 carbon atoms of which the methylene moiety may be interrupted by —O— or —CO—; and the ring containing G' and T' is a 5-membered ring optionally containing a hetero atm, a 6-membered ring optionally containing a hetero atom, a quinoline ring, an isoquinoline ring, or an anthraquinone ring, each optionally substituted with a halogen atom, a hydroxyl group, a nitro group, a cyano group, an alkyl group having 1 to 4 carbon atoms, or an alkoxy group having 1 to 4 carbon atoms;

[Chem. 3]

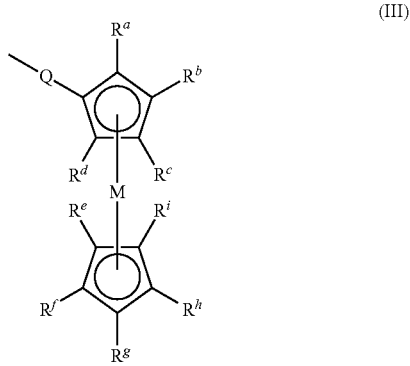

wherein $R^a$, $R^b$, $R^c$, $R^d$, $R^e$, $R^f$, $R^g$, $R^h$, and $R^i$ each independently represent a hydrogen atom or an alkyl group having 1 to 4 carbon atoms of which the methylene moiety may be interrupted by —O— or —CO—; Q represents a direct bond or an optionally substituted alkylene group having 1 to 8 carbon atoms of which the methylene moiety may be interrupted by —O—, —S—, —CO—, —COO—, —OCO—, —SO$_2$—, —NH—, —CONH—, —NHCO—, —N=CH—, or —CH=CH—; and M represents Fe, Co, Ni, Ti, Cu, Zn, Zr, Cr, Mo, Os, Mn, Ru, Sn, Pd, Rh, Pt, or Ir;

[Chem. 4]

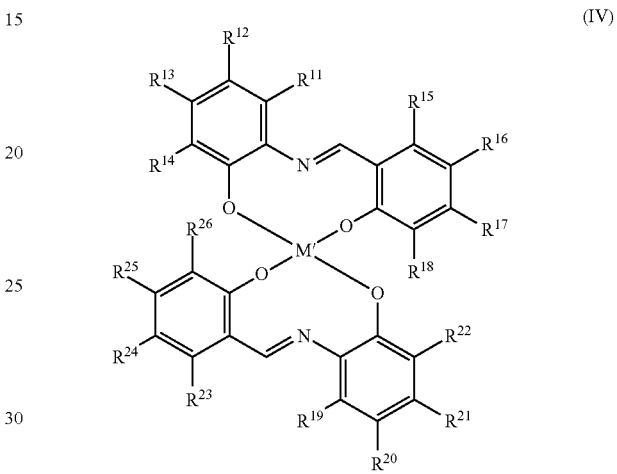

wherein M' represents Fe, Co, Ni, Cu, Cr, Mo, Os, Mn, Ru, Sn, Pd, Rh, Pt, Al, or Ir; $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, and $R^{26}$ each independently represent a hydrogen atom, a halogen atom, an alkyl group having 1 to 20 carbon atoms, an aryl group having 6 to 30 carbon atoms, an arylalkyl group having 7 to 30 carbon atoms, a nitro group, a cyano group, or —NRR'; R and R' each represent an alkyl group having 1 to 4 carbon atoms; and any adjacent two of $R^{11}$ through $R^{26}$ may be taken together to form a 5- or 6-membered ring.

The invention also provides an optical recording material containing at least one organic salt compound described.

The invention also provides an optical recording medium including an optical recording layer formed of the optical recording material.

Advantageous Effects of Invention

The invention provides an organic salt compound excellent in sensitivity and light resistance and suitable as an optical element. An optical recording material containing the organic salt compound is particularly suitably used to form an optical recording layer of an optical recording medium writable and readable with short wavelength laser light.

DESCRIPTION OF EMBODIMENTS

The organic salt compound, the optical recording material containing the organic salt compound, and the optical recording medium using the optical recording material according to the invention will be described in detail with reference to their preferred embodiments.

Examples of the C1-C20 alkyl group represented by $R^1$ through $R^{10}$, $Y^1$, $Y^2$, and $Y^3$ in formula (I) and $R^{11}$ through $R^{26}$ in formula (IV) include methyl, ethyl, propyl, isopropyl, butyl, s-butyl, t-butyl, isobutyl, amyl, isoamyl, t-amyl, hexyl, cyclohexyl, cyclohexylmethyl, 2-cyclohexylethyl, heptyl, isoheptyl, t-heptyl, n-octyl, isooctyl, t-octyl, 2-ethylhexyl, nonyl, isononyl, decyl, dodecyl, tridecyl, tetradecyl, pentadecyl, hexadecyl, heptadecyl, octadecyl, 2-methoxyethyl, 3-methoxypropyl, 4-methoxybutyl, 2-butoxyethyl, methoxyethoxyethyl, methoxyethoxyethoxyethyl, 3-methoxybutyl, and 2-methylthioethyl.

Examples of the C6-C30 aryl group represented by $R^1$ through $R^{10}$, $Y^1$, $Y^2$, and $Y^3$ in formula (I) and $R^{11}$ through $R^{26}$ in formula (IV) include phenyl, naphthyl, 2-methylphenyl, 3-methylphenyl, 4-methylphenyl, 4-vinylphenyl, 3-isopropylphenyl, 4-isopropylphenyl, 4-butylphenyl, 4-isobutylphenyl, 4-t-butylphenyl, 4-hexylphenyl, 4-cyclohexylphenyl, 4-octylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-t-butylphenyl, and cyclohexylphenyl.

Examples of the C7-C30 arylalkyl group represented by $R^1$ through $R^{10}$, $Y^1$, $Y^2$, and $Y^3$ in formula (I) and $R^{11}$ through $R^{26}$ in formula (IV) include benzyl, phenethyl, 2-phenylpropan-2-yl, diphenylmethyl, triphenylmethyl, styryl, cinnamyl, 2-phenoxyethyl, and 2-phenylthioethyl.

The alkyl group represented by $R^1$ through $R^{10}$, $Y^1$, $Y^2$, and $Y^3$ in formula (I) and $R^{11}$ through $R^{26}$ in formula (IV) and the aryl group and the arylalkyl group represented by $R^1$ through $R^{10}$, $Y^1$ and $Y^2$ in formula (I) and $R^{11}$ through $R^{26}$ in formula (IV) are each optionally substituted. When the alkyl, aryl, or arylalkyl group is substituted with a carbon-containing substituent, the total number of carbon atoms of the group inclusive of the carbon atom(s) of the substituent should fall within the respective ranges recited above.

Examples of the substituent include alkyl groups, such as methyl, ethyl, propyl, isopropyl, cyclopropyl, butyl, s-butyl, t-butyl, isobutyl, amyl, isoamyl, t-amyl, cyclopentyl, hexyl, 2-hexyl, 3-hexyl, cyclohexyl, bicyclohexyl, 1-methylcyclohexyl, heptyl, 2-heptyl, 3-heptyl, isoheptyl, t-heptyl, n-octyl, isooctyl, t-octyl, 2-ethylhexyl, nonyl, isononyl, and decyl; alkoxy groups, such as methyloxy, ethyloxy, propyloxy, isopropyloxy, butyloxy, s-butyloxy, t-butyloxy, isobutyloxy, amyloxy, isoamyloxy, t-amyloxy, hexyloxy, cyclohexyloxy, heptyloxy, isoheptyloxy, t-heptyloxy, n-octyloxy, isooctyloxy, t-octyloxy, 2-ethylhexyloxy, nonyloxy, and decyloxy; alkylthio groups, such as methylthio, ethylthio, propylthio, isopropylthio, butylthio, s-butylthio, t-butylthio, isobutylthio, amylthio, isoamylthio, t-amylthio, hexylthio, cyclohexylthio, heptylthio, isoheptylthio, t-heptylthio, n-octylthio, isooctylthio, t-octylthio, and 2-ethylhexylthio; alkenyl groups, such as vinyl, 1-methylethenyl, 2-methylethenyl, 2-propenyl, 1-methyl-3-propenyl, 3-butenyl, 1-methyl-3-butenyl, isobutenyl, 3-pentenyl, 4-hexenyl, cyclohexenyl, bicyclohexenyl, heptenyl, octenyl, decenyl, pentadecenyl, eicosenyl, and tricosenyl; arylalkyl groups, such as benzyl, phenethyl, diphenylmethyl, triphenylmethyl, styryl, and cinnamyl; aryl groups, such as phenyl and naphthyl; aryloxy groups, such as phenoxy and naphthyloxy; arylthio groups, such as phenylthio and naphthylthio; heterocyclic groups, such as pyridyl, pyrimidyl, pyridazyl, piperidyl, pyranyl, pyrazolyl, triazyl, pyrrolyl, quinolyl, isoquinolyl, imidazolyl, benzimidazolyl, triazolyl, furyl, furanyl, benzofuranyl, thienyl, thiophenyl, benzothiophenyl, thiadiazolyl, thiazolyl, benzothiazolyl, oxazolyl, benzoxazolyl, isothiazolyl, isoxazolyl, indolyl, 2-pyrrolidinon-1-yl, 2-piperidon-1-yl, 2,4-dioxyimidazolidin-3-yl, and 2,4-dioxyoxazolidin-3-yl; halogen atoms, such as fluorine, chlorine, bromine, and iodine; acyl groups, such as acetyl, 2-chloroacetyl, propionyl, octanoyl, acryloyl, methacryloyl, phenylcarbonyl (benzoyl), phthaloyl, 4-trifluoromethylbenzoyl, pivaloyl, salicyloyl, oxaloyl, stearoyl, methoxycarbonyl, ethoxycarbonyl, t-butoxycarbonyl, n-octadecyloxycarbonyl, and carbamoyl; ester groups, such as methyl ester, ethyl ester, n-butyl ester, t-butyl ester, and n-propyl ester; acyloxy groups, such as acetyloxy and benzoyloxy; amino and substituted amino groups, such as ethylamino, dimethylamino, diethylamino, butylamino, cyclopentylamino, 2-ethylhexylamino, dodecylamino, anilino, chlorophenylamino, toluidino, anisidino, N-methylanilino, diphenylamino, naphthylamino, 2-pyridylamino, methoxycarbonylamino, phenoxycarbonylamino, acetylamino, benzoylamino, formylamino, pivaloylamino, lauroylamino, carbamoylamino, N,N-dimethylaminocarbonylamino, N,N-diethylaminocarbonylamino, morpholinocarbonylamino, methoxycarbonylamino, ethoxycarbonylamino, t-butoxycarbonyl-amino, n-octadecyloxycarbonylamino, N-methyl-methoxycarbonylamino, phenoxycarbonylamino, sulfamoylamino, N,N-dimethylaminosulfonylamino, methylsulfonylamino, butylsulfonylamino, and phenylsulfonylamino; sulfonamido, sulfonyl, carboxyl, cyano, sulfo, hydroxyl, nitro, mercapto, imido, carbamoyl, and sulfonamido. These groups may further be substituted. The carboxyl and sulfo may be in salt form.

In formula (I), $R^1$ and $R^2$ may be taken together to form a 3- to 6-membered ring. Examples of the group forming the 3- to 6-membered ring include cyclopropane-1,1-diyl, cyclobutane-1,1-diyl, 2,4-dimethylcyclobutane-1,1-diyl, 3-dimethylcyclobutane-1,1-diyl, cyclopentane-1,1-diyl, cyclohexane-1,1-diyl, tetrahydropyran-4,4-diyl, thiane-4,4-diyl, piperidine-4,4-diyl, N-substituted piperidine-4,4-diyl, morpholine-2,2-diyl, morpholine-3,3-diyl, N-substituted morpholine-2,2-diyl, and N-substituted morpholine-3,3-diyl, in which the N-substituent is exemplified by C1-C10 alkyl, C6-C20 aryl, C7-C20 arylalkyl, nitro, cyano, and halogen.

$R^4$ and $R^5$ in formula (I) may be taken together to form a 6-membered ring, such as a benzene ring or a cyclohexane ring. When the ring is a benzene ring, $R^3$ and $R^6$ are nil. The 6-membered ring may be fused to another ring or be substituted. Such a ring is exemplified by a naphthalene ring and an anthracene ring.

Examples of the halogen atom as represented by $R^7$ to $R^{10}$ in formula (I) are fluorine, chlorine, bromine, and iodine.

Any adjacent two of $R^7$, $R^8$, $R^9$, and $R^{10}$ in formula (I) and any adjacent two or $R^{11}$ through $R^{26}$ in formula (IV) may be taken together to form a 5- or 6-membered ring. Examples of the 5-membered ring are pyrrole, pyrazolidine, pyrazole, imidazole, imidazolidine, oxazole, isoxazole, isoxazolidine, thiazole, and isothiazolidine. Examples of the 6-membered ring are benzene, piperidine, piperazine, morpholine, thiomorpholine, pyridine, pyrazine, pyrimidine, pyridazine, and triazine. These rings may be fused to another ring or be substituted. Examples of such rings include naphthalene, quinoline, isoquinoline, indole, julolidine, benzoxazole, benzotriazole, hexahydro-2H-quinolidine, and octahydro-2H-quinolidine.

Examples of the halogen atom as represented by le $R^{01}$, $R^{02}$, $R^{03}$, and $R^{04}$ in formula (II) and $R^{01'}$ in formula (II') are fluorine, chlorine, bromine, and iodine. Examples of the C1-C4 alkyl as represented by $R^{01}$, $R^{02}$, $R^{03}$, and $R^{04}$ in formula (II) and $R^{01'}$ in formula (II') are methyl, ethyl, propyl, isopropyl, butyl, s-butyl, t-butyl, and isobutyl. Examples of the alkyl group a methylene moiety of which is interrupted by —O— include methoxy, ethoxy, propoxy, isopropoxy, methoxymethyl, ethoxymethyl, and 2-methoxyethyl. Examples of the alkyl group a methylene moiety of which is interrupted by —CO— include acetyl, 1-carbonylethyl, acetylmethyl, 1-carbonylpropyl, 2-oxobutyl, 2-acetylethyl, and 1-carbonylisopropyl. These alkyl groups may have a substituent.

Examples of the cycloalkene ring formed by taking $R^{01}$ and $R^{04}$ together include cyclopropene, cyclobutene, cyclopentene, and cyclohexene. Examples of the heterocyclic ring formed by taking $R^{01}$ and $R^{04}$ together include tetrahydropyran, piperidine, piperazine, pyrrolidine, morpholine, thiomorpholine, pyridine, pyrazine, pyrimidine, pyridazine, triazine, quinoline, isoquinoline, imidazole, oxazole, imidazolidine, pyrazolidine, isoxazolidine, and isothiazolidine. These rings may be fused to another ring or be substituted.

Examples of the substituent of the C1-C4 alkyl represented by $R^{01}$, $R^{02}$, $R^{03}$, and $R^{04}$ in formula (II) and $R^{01'}$ in formula (II') and of the cyclic structure formed by taking $R^{01}$ and $R^{04}$ in formula (II) include those described with respect to formula (I). When the substituent is a carbon-containing substituent, the total number of carbon atoms of the group represented by $R^{01}$ to $R^{04}$ and $R^{01'}$ inclusive of the carbon atom(s) of the substituent should fall within the range recited.

Examples of the 5-membered ring optionally containing a hetero atom in formula (II') include imidazole, thiazole, pyrazole, oxazole, isoxazole, thiophene, furan, and pyrrole. Examples of the 6-membered ring optionally containing a hetero atom in formula (II') include pyridine, piperazine, piperidine, morpholine, pyrazine, pyrone, and pyrrolidine.

Examples of the halogen atom that may substitute the ring containing G' and T' are the same as those recited above with respect to $R^{01}$ to $R^{04}$ and $R^{01'}$. Examples of the C1-C4 alkyl that may substitute the ring containing G' and T' in formula (II') are the same as those recited above with respect to $R^{01}$ to $R^{04}$ and $R^{01'}$. Examples of the C1-C4 alkoxy that may substitute the ring containing G' and T' include those derived from the above described alkyl.

Examples of the C1-C4 alkyl represented by $R^a$ through $R^i$ in formula (III) include those recited above with respect to formula (II). Examples of the alkyl group a methylene moiety of which is interrupted by —O— include methoxy, ethoxy, propoxy, isopropoxy, methoxymethyl, ethoxymethyl, and 2-methoxyethyl. Examples of the alkyl group a methylene moiety of which is interrupted by —CO-include acetyl, 1-carbonylethyl, acetylmethyl, 1-carbonylpropyl, 2-oxobutyl, 2-acetylethyl, and 1-carbonylisopropyl.

Examples of the optionally substituted C1-C8 alkylene as represented by Q in formula (III) include methylene, ethylene, propylene, methylethylene, butylene, 1-methylpropylene, 2-methylpropylene, 1,2-dimethylpropylene, 1,3-dimethylpropylene, 1-methylbutylene, 2-methylbutylene, 3-methylbutylene, 4-methylbutylene, 2,4-dimethylbutylene, 1,3-dimethylbutylene, pentylene, hexylene, heptylene, octylene, ethane-1,1-diyl, and propane-2,2-diyl. Examples of the alkylene of which methylene is interrupted by —O—, —S—, —CO—, —COO—, —OCO—, —SO$_2$—, —NH—, —CONH—, —NHCO—, —N=CH—, or —CH=CH— include methyleneoxy, ethyleneoxy, oxymethylene, thiomethylene, carbonylmethylene, carbonyloxymethylene, methylenecarbonyloxy, sulfonylmethylene, aminomethylene, acetylamino, ethylenecarboxyamide, ethaneimidoyl, ethenylene, and propenylene.

The C1-C4 alkyl represented by $R^a$ through $R^i$ in formula (III) and the C1-C8 alkylene represented by Q in formula (III) may have a substituent.

Examples of the substituent are the same as those recited above. The above description about the number of carbon atoms also applies here.

Examples of the halogen represented by $R^{11}$ through $R^{26}$ in formula (IV) are the same as described with respect to formula (II).

Examples of the C1-C4 alkyl represented by R and R' in formula (IV) are the same as those described with respect to formula (II).

As is apparent from formula (IV), the azomethine complex anion of formula (IV) has two azomethine ligands coordinating to the metal atom. The two azomethine ligands may be the same or different from each other.

The monomethine cyanine cation (I) have the resonant structures as shown below and may be represented by either formula (I) or (I'). In the description, formula (I) is used to depict the monomethine cyanine cation of the invention.

Some of the monomethine cyanine cations of formula (I) embrace optical isomers including enantiomers, diastereomers, and racemates thereof having a chiral center at the asymmetric carbon atom to which $R^1$ and $R^2$ are bonded, the asymmetric carbon atom to which $R^3$ and $R^4$ are bonded, or the asymmetric carbon atom to which $R^5$ and $R^6$ are bonded. Any of these optical isomers, individual or mixed, is usable.

[Chem. 5]

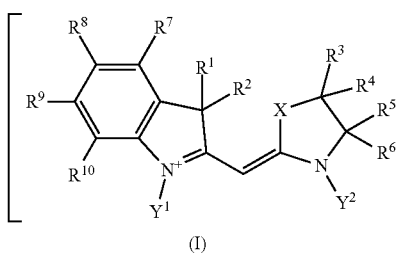 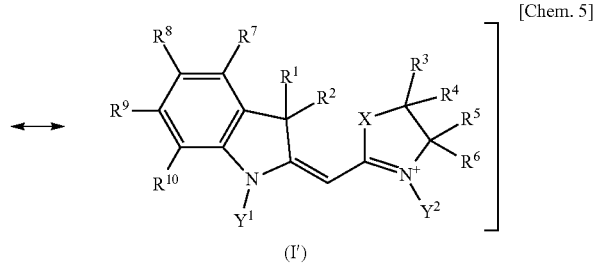

(I)  (I')

Of the organic salt compounds those in which $R^1$ is C1-C5 alkyl (especially methyl), $R^2$ is optionally substituted C7-C12 arylalkyl (especially benzyl), and $Y^1$ and $Y^2$ are each C1-C8 alkyl in formula (I) and M' is Fe, Co, Ni, Cr, or Mn (especially Co) and $R^{11}$ to $R^{26}$ are each hydrogen, nitro, —NRR', halogen, or alkyl (especially hydrogen, nitro, or —NRR') in formula (IV) are preferred in view of excellent decomposition behavior during optical recording with a laser beam, high sensitivity, and low production cost.

Of the organic salt compounds composed of the monomethine cyanine cation (I) and the azomethine complex anion (IV), those represented by formula (V) shown below are preferred in terms of low production cost, high absorption characteristics in the wavelength of 380 to 420 nm that are suited for use as an optical recording layer of an optical recording medium writable/readable using shorter wavelength lasers, as well as excellent decomposition behavior.

[Chem. 6]

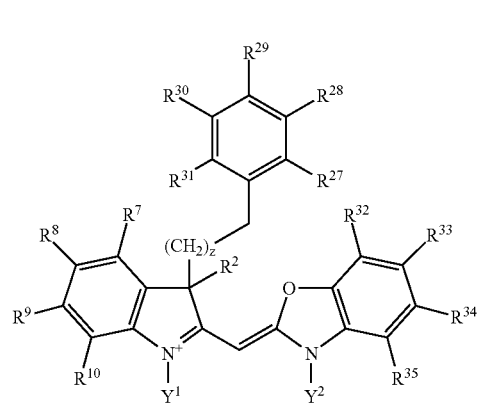

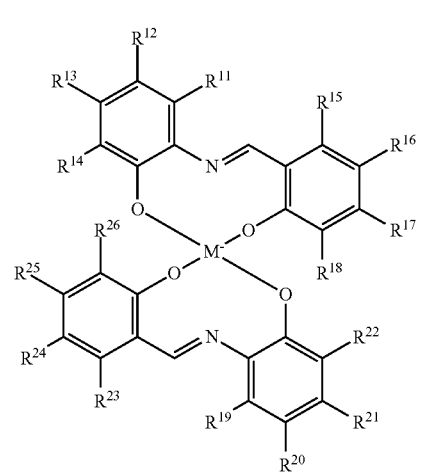

wherein $R^2$, $R^7$, $R^8$, $R^9$, $R^{10}$, $Y^1$, and $Y^2$ are as defined for formula (I); z represents a number of 0 to 4; $R^{27}$ through $R^{35}$ each represent hydrogen, halogen, nitro, cyano, carboxyl, C1-C5 ester group, C1-C4 alkyl, or C1-C4 alkoxy; any adjacent two of $R^{27}$ to $R^{35}$ may be taken together to form a C3-C12 carbocyclic ring; and $R^{11}$ to $R^{26}$ and M' are as defined for formula (IV).

Examples of the C3-C12 carbocyclic ring formed by adjacent two of $R^{27}$ through $R^{35}$ in formula (V) include benzene, cyclohexene, and naphthalene.

Specific examples of the monomethine cyanine cation (I) include cation Nos. 1 through 139 shown below, in which the double bond may taken on a resonant structure.

[Chem. 7]

Cation No. 1

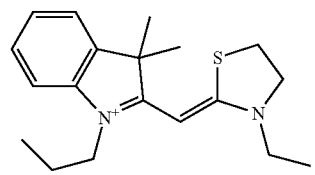

Cation No. 2

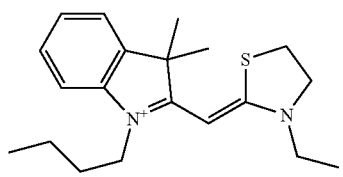

Cation No. 3

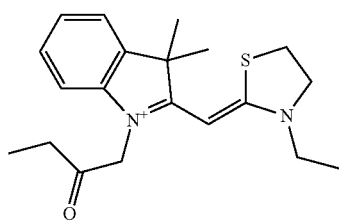

-continued

Cation No. 4

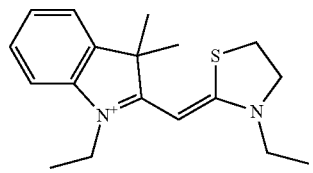

Cation No. 5

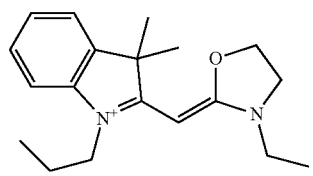

Cation No. 6

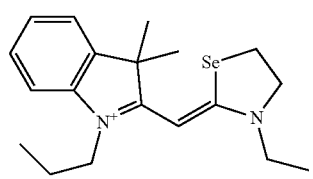

Cation No. 7

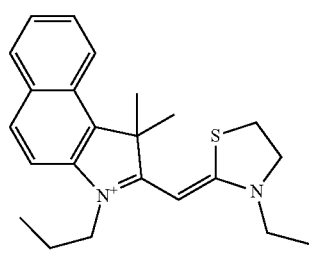

Cation No. 8

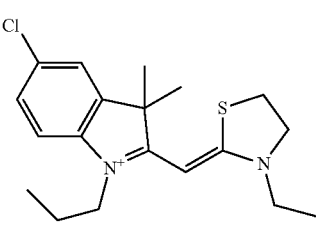

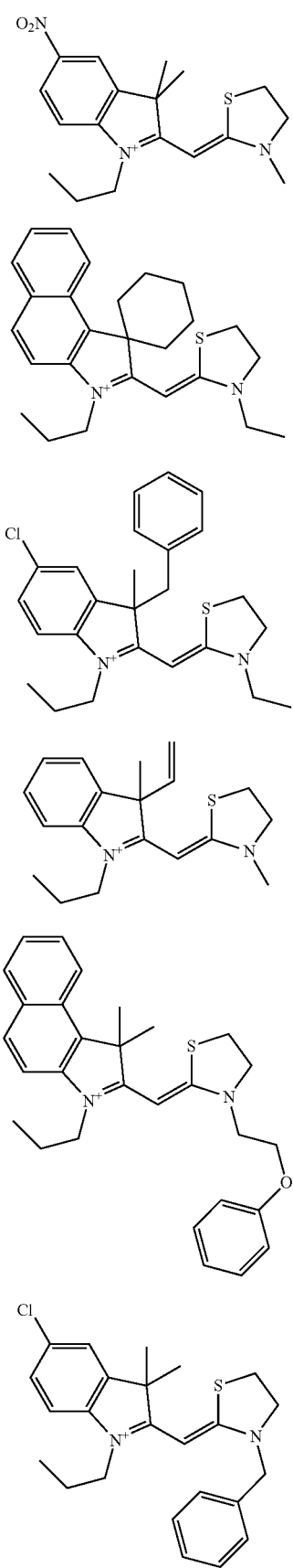
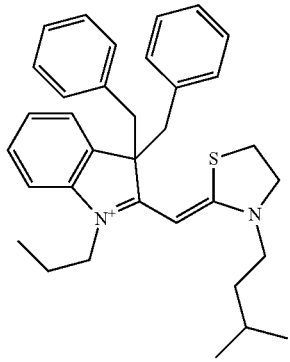
Cation No. 15
[Chem. 8]
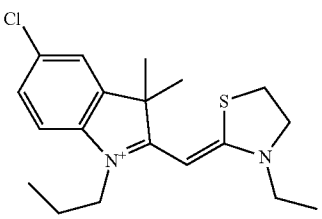
Cation No. 16
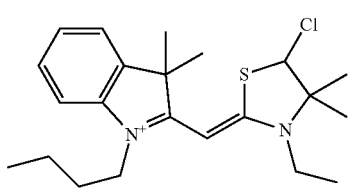
Cation No. 17
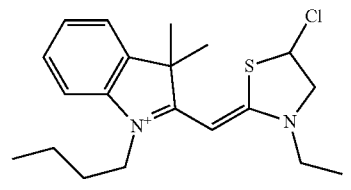
Cation No. 18
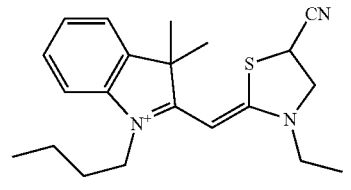
Cation No. 19
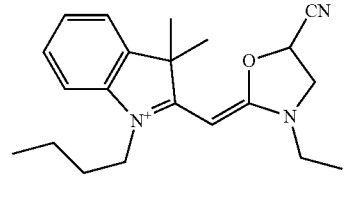
Cation No. 20
Cation No. 21

Cation No. 22
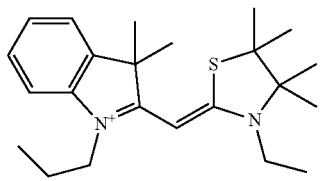
Cation No. 23
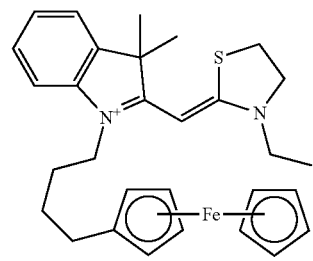
Cation No. 24
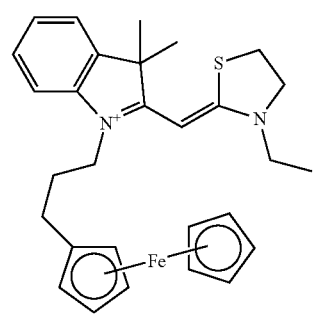
Cation No. 25
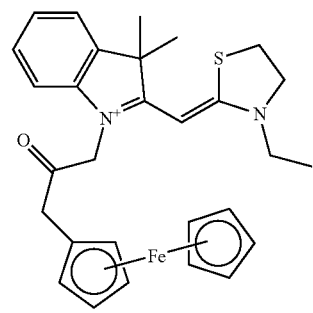
Cation No. 26
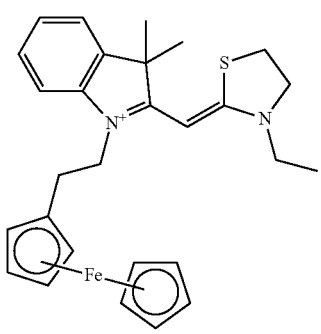
Cation No. 27
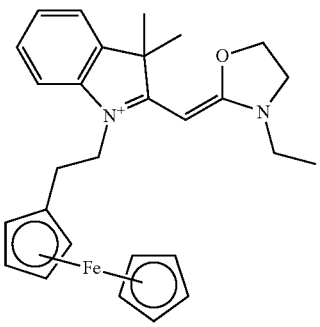
Cation No. 28
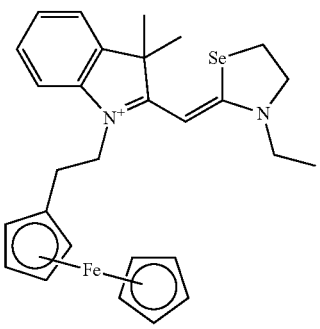
Cation No. 29
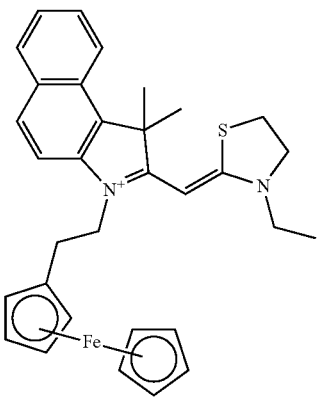
Cation No. 30
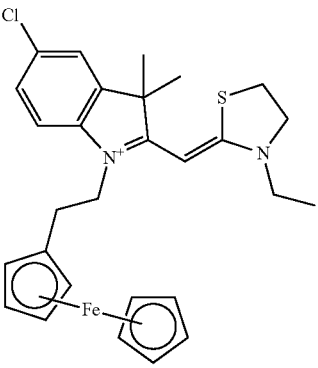

-continued
Cation No. 31
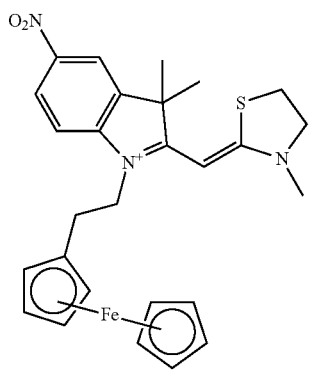
Cation No. 35
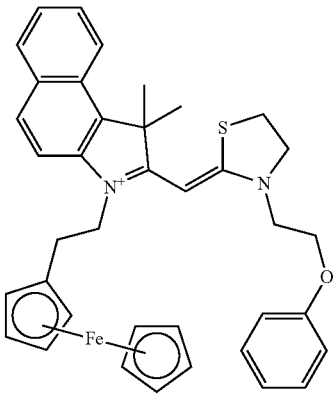
Cation No. 32
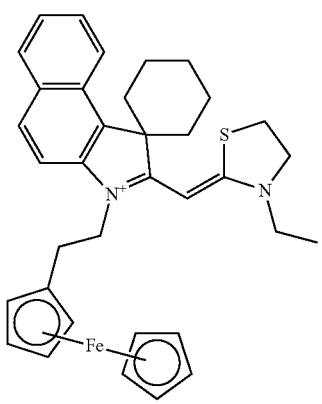
Cation No. 36
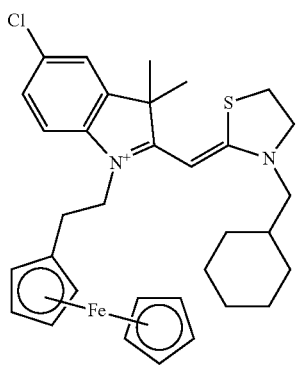
Cation No. 33
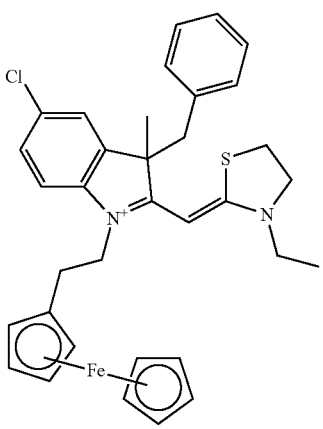
Cation No. 37
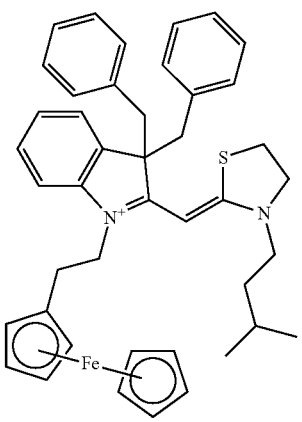
Cation No. 34
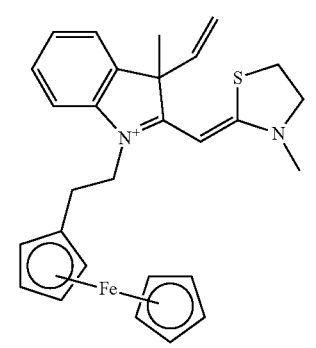
Cation No. 38
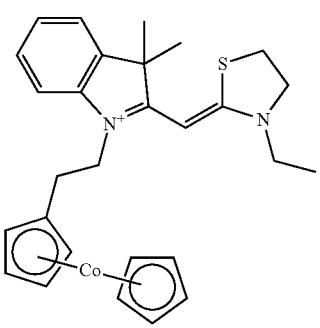

Cation No. 39
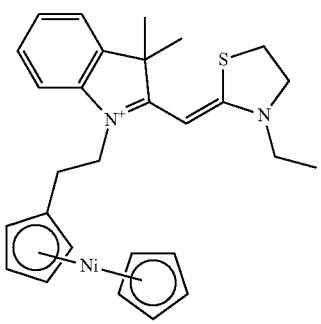
[Chem. 10]
Cation No. 40
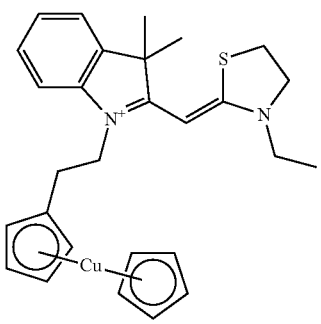
Cation No. 41
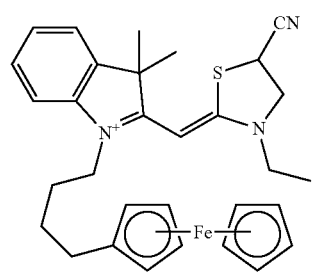
Cation No. 42
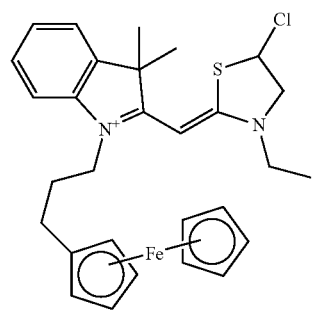
Cation No. 43
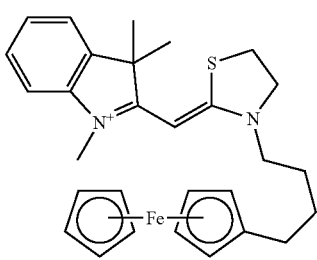
Cation No. 44
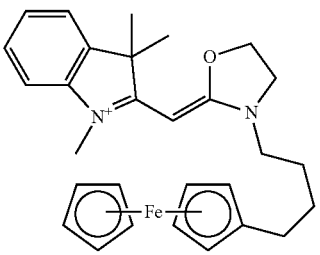
Cation No. 45
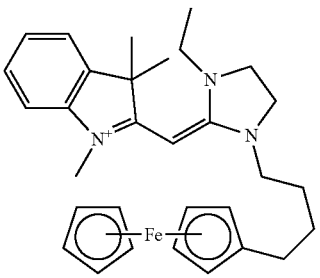
Cation No. 46
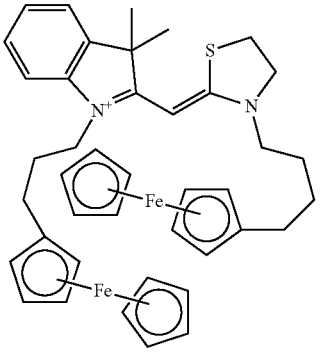
Cation No. 47
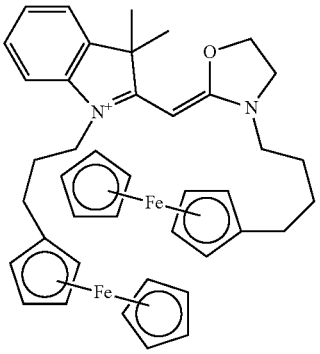
Cation No. 48
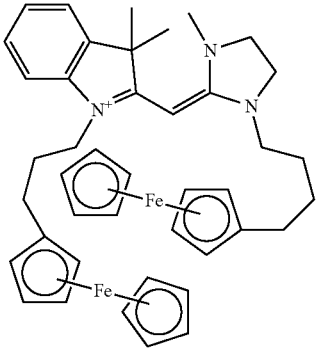

Cation No. 49
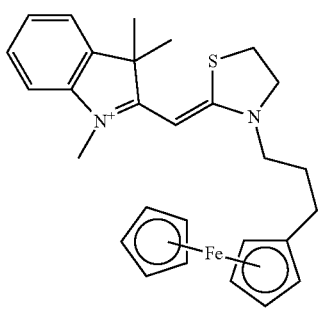
Cation No. 50
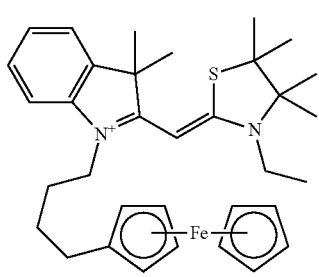
Cation No. 51
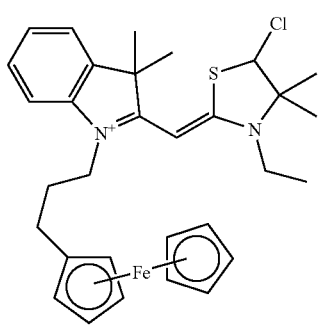
[Chem. 11]
Cation No. 52
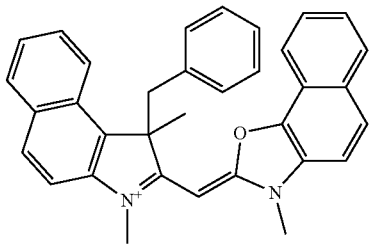
Cation No. 53
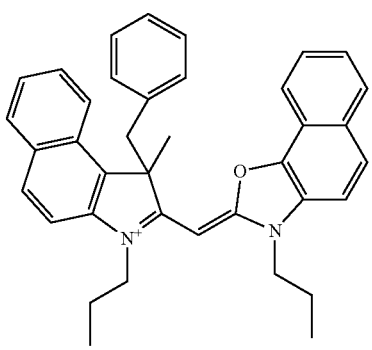
Cation No. 54
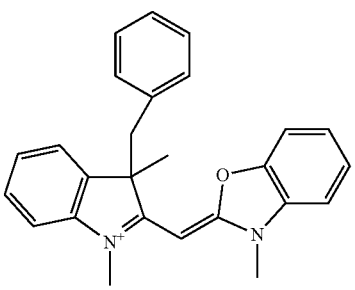
Cation No. 55
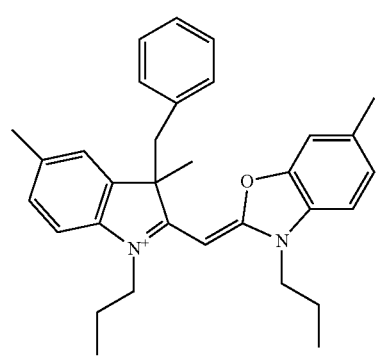
Cation No. 56
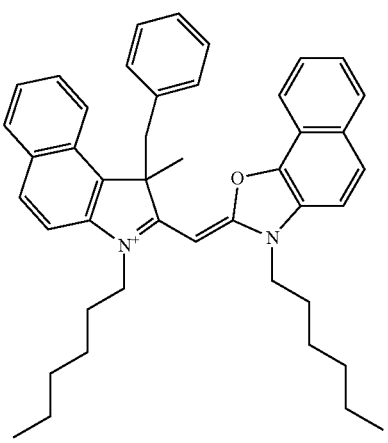
Cation No. 57
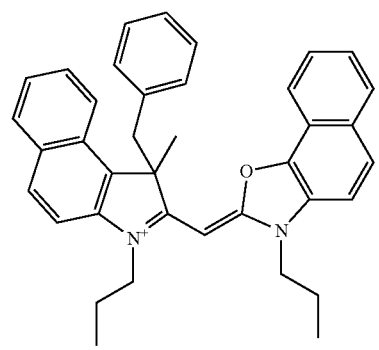

Cation No. 58
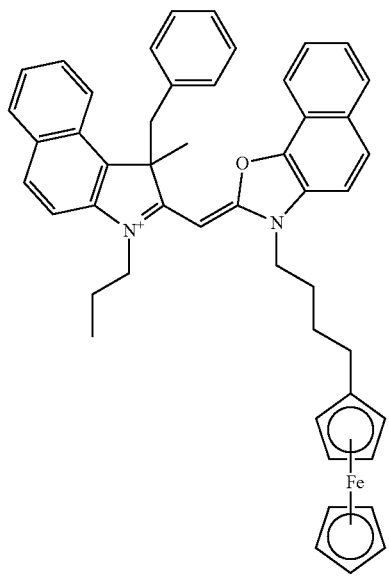
Cation No. 59
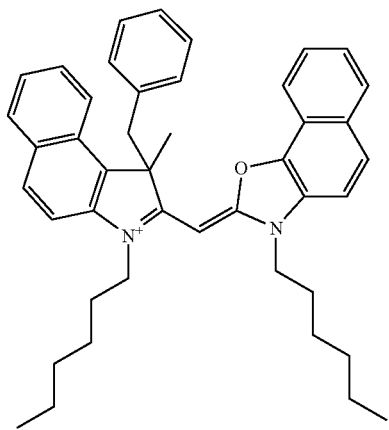
Cation No. 60
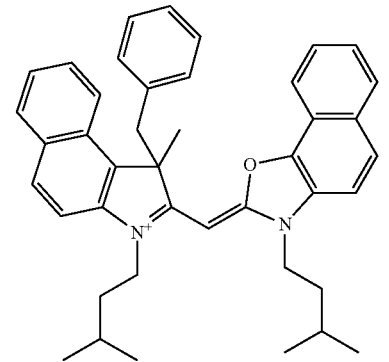
Cation No. 61
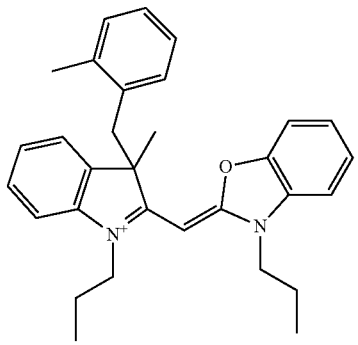
Cation No. 62
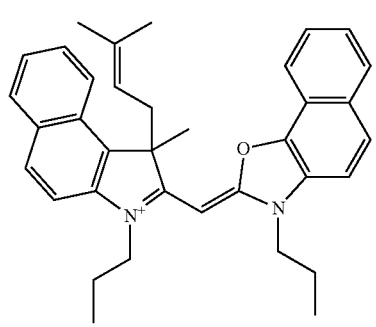
Cation No. 63
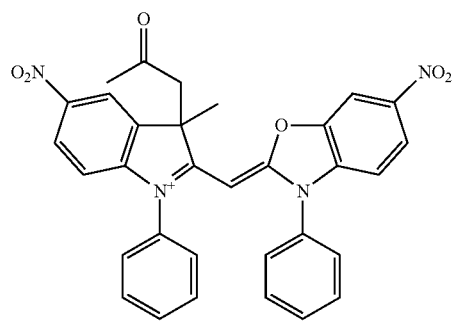
[Chem. 12]
Cation No. 64
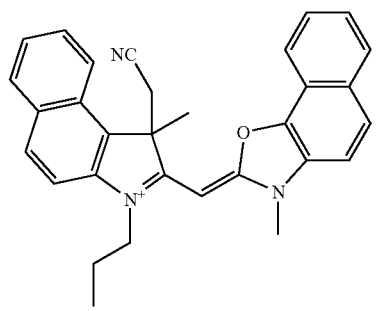

Cation No. 65
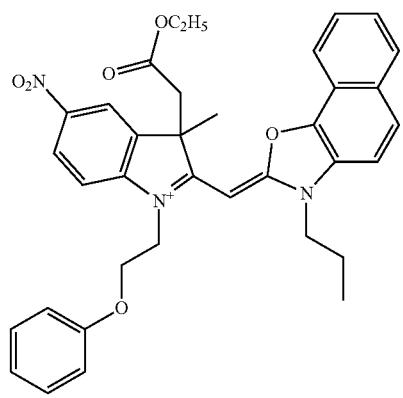
Cation No. 66
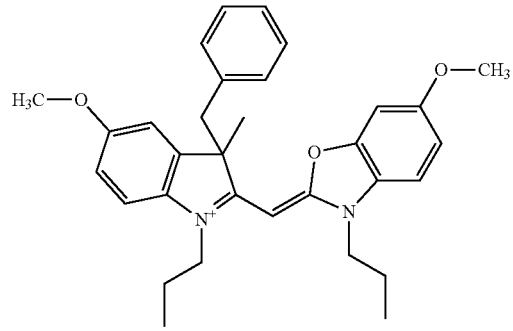
Cation No. 67
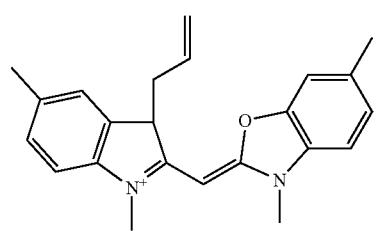
Cation No. 68
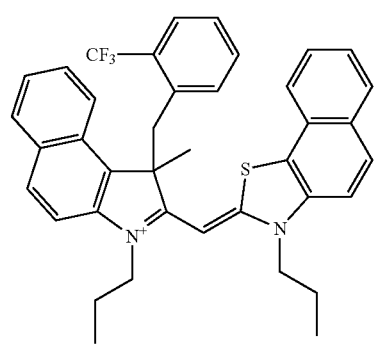
Cation No. 69
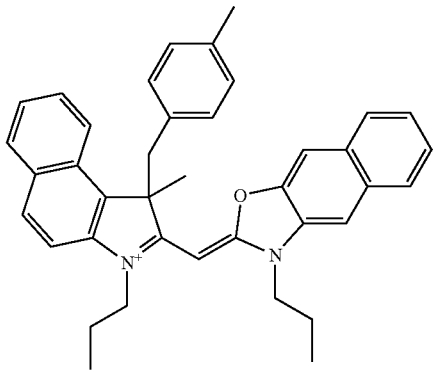
Cation No. 70
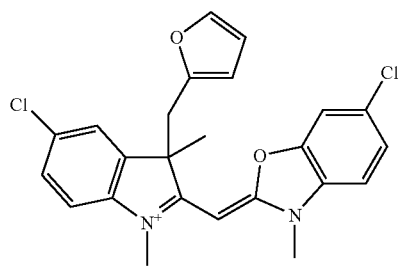
Cation No. 71
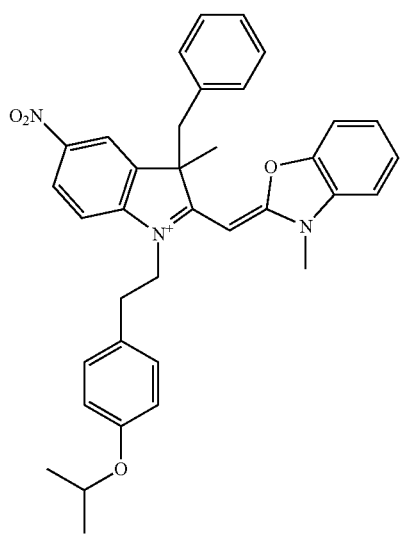
Cation No. 72
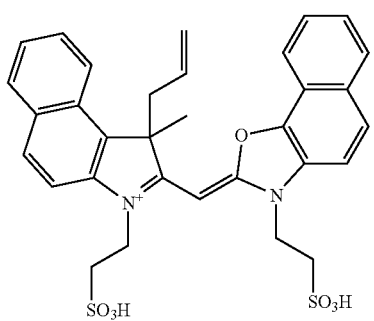

Cation No. 73
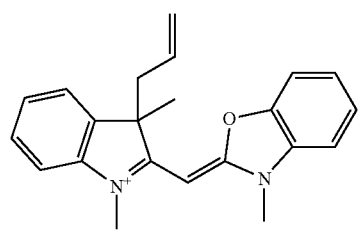
Cation No. 74
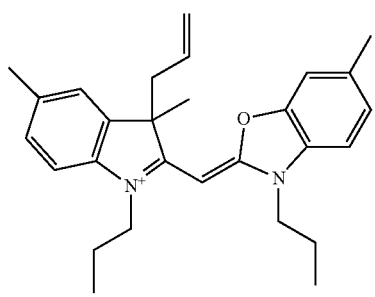
Cation No. 75
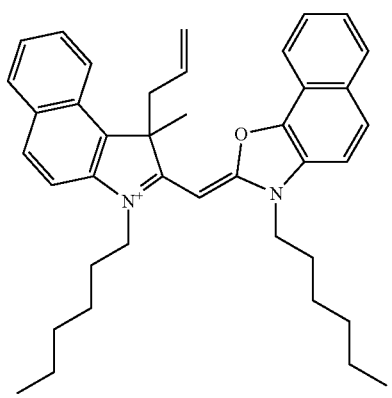
[Chem. 13-1]
Cation No. 76
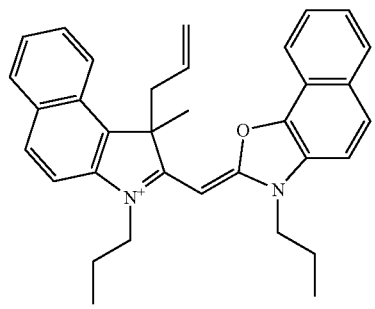
Cation No. 77
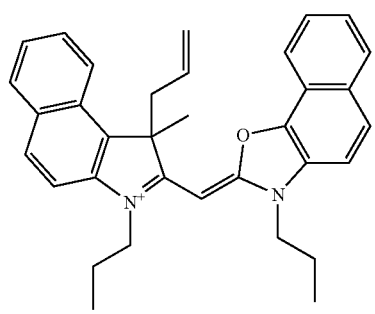
Cation No. 78
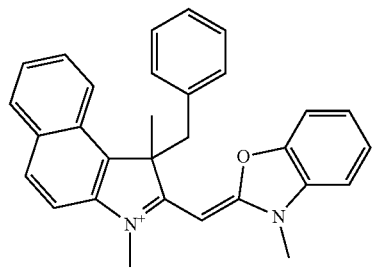
Cation No. 79
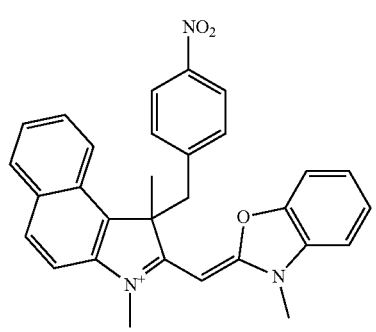
Cation No. 80
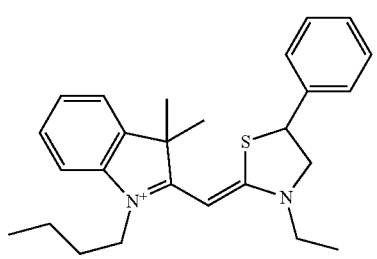
Cation No. 81
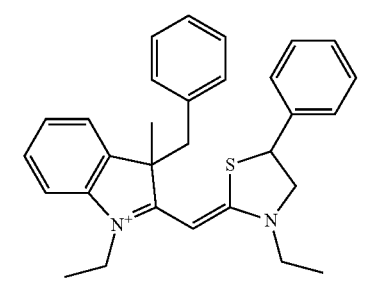
Cation No. 82
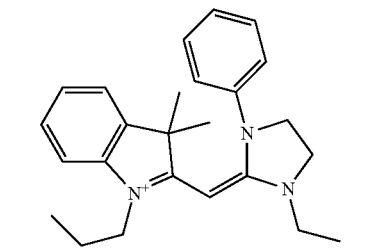
Cation No. 83
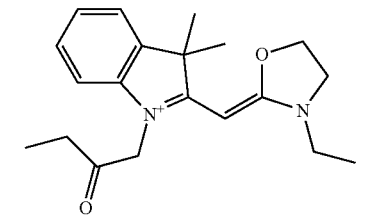

Cation No. 84
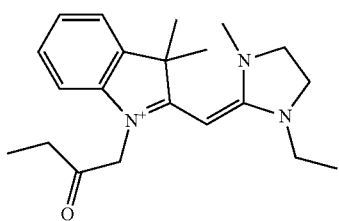
Cation No. 85
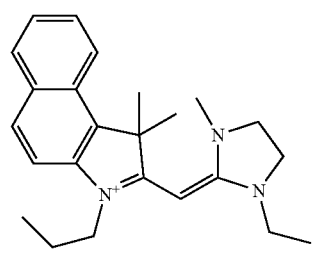
Cation No. 86
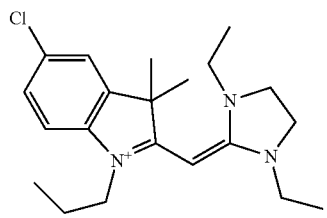
Cation No. 87
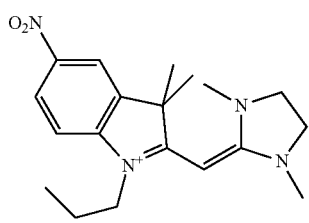
[Chem. 13-2]
Cation No. 88
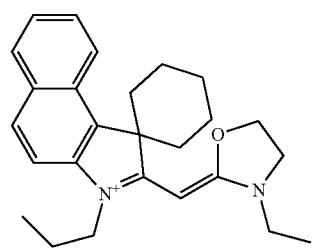
Cation No. 89
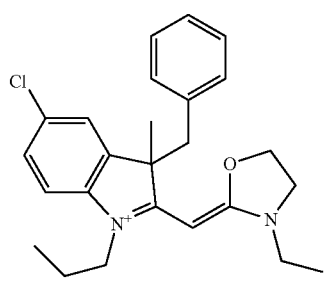
Cation No. 90
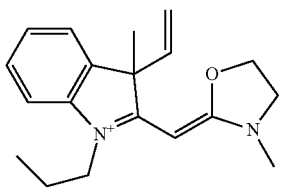
Cation No. 91
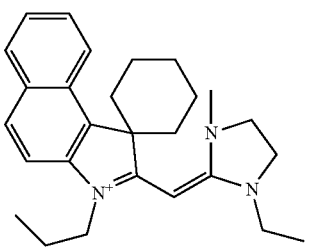
Cation No. 92
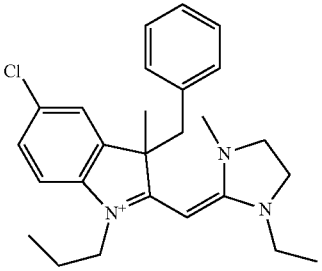
Cation No. 93
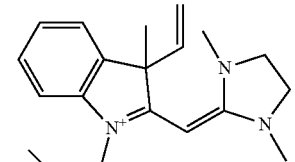
Cation No. 94
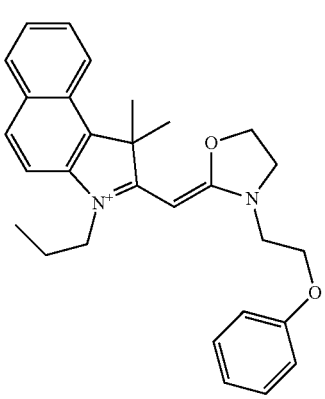
Cation No. 95
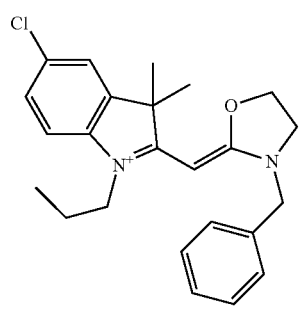

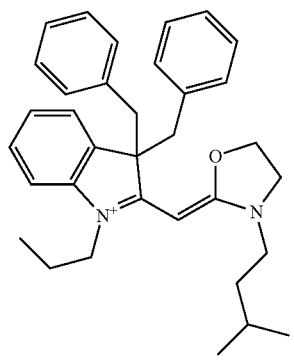
[Chem 13-3]
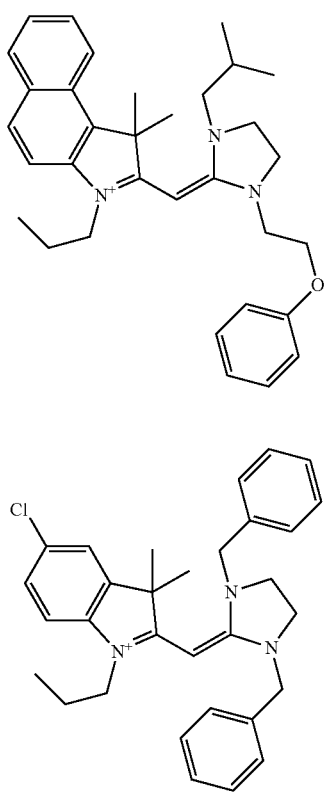
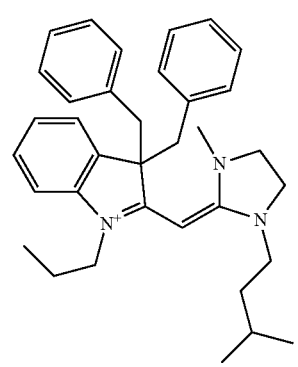
Cation No. 96
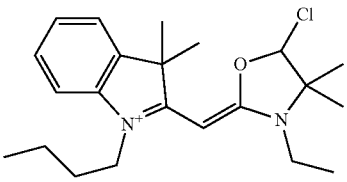
Cation No. 97
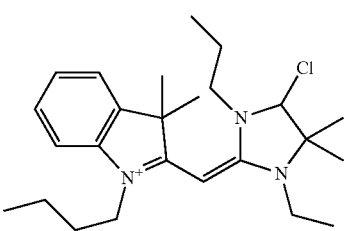
Cation No. 98
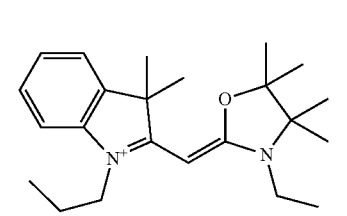
Cation No. 99
Cation No. 100
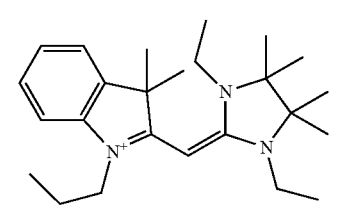
Cation No. 101
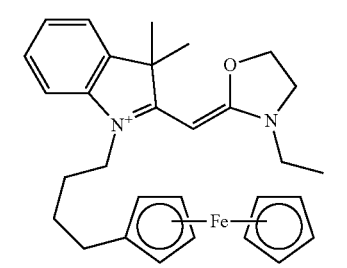
Cation No. 102
Cation No. 103
Cation No. 104
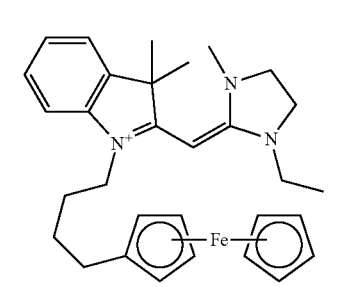
Cation No. 105

Cation No. 106
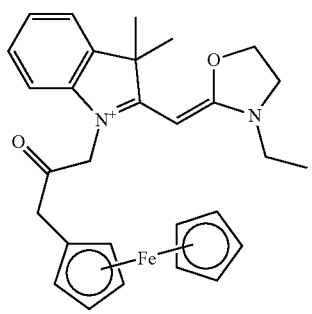
Cation No. 107
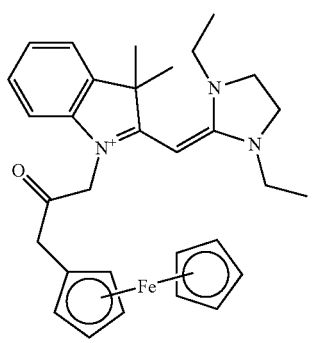
Cation No. 108
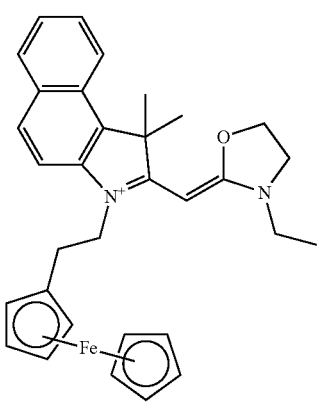
[Chem. 13-4]
Cation No. 109
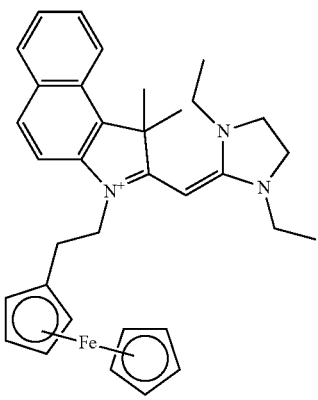
Cation No. 110
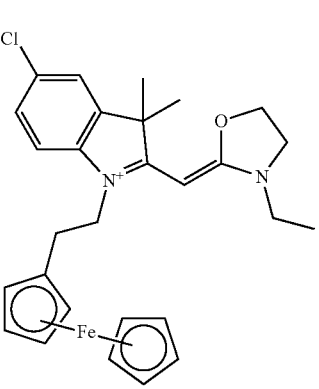
Cation No. 111
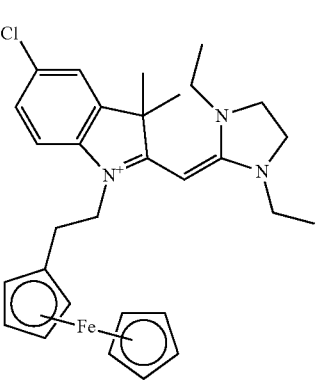
Cation No. 112
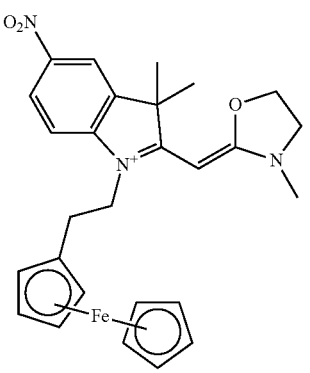
Cation No. 113

Cation No. 114
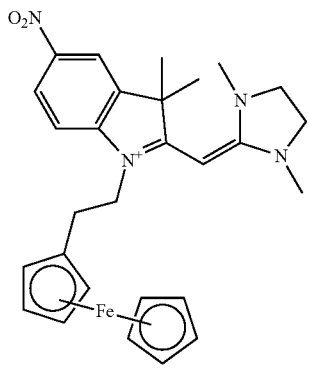
Cation No. 115
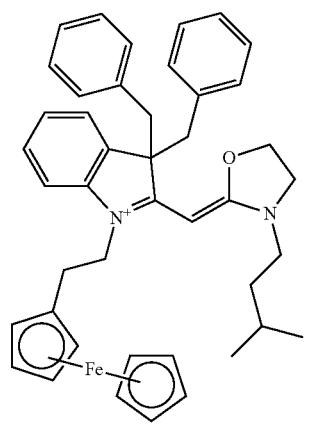
Cation No. 116
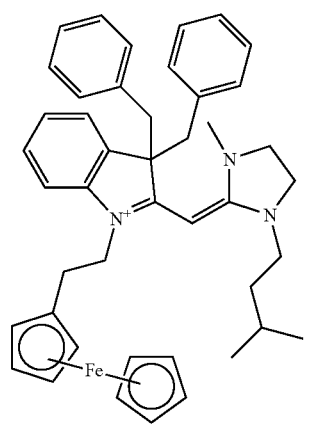
Cation No. 117
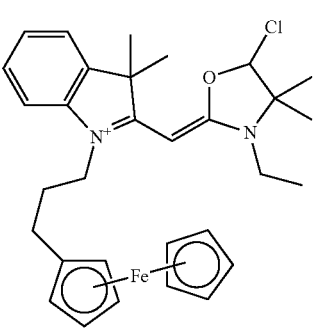
[Chem. 13-5]
Caption No. 118A
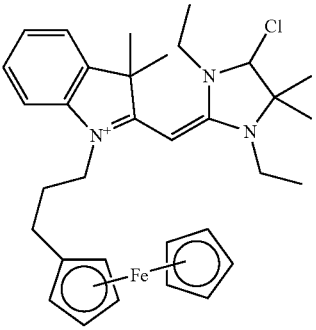
Cation No. 119A
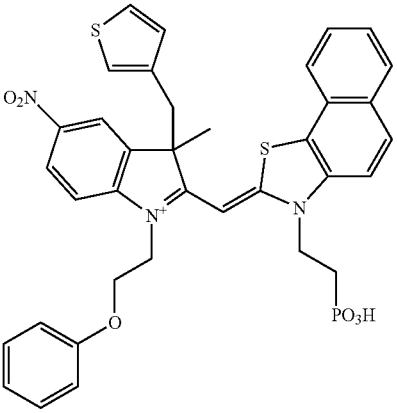
Cation No. 120A
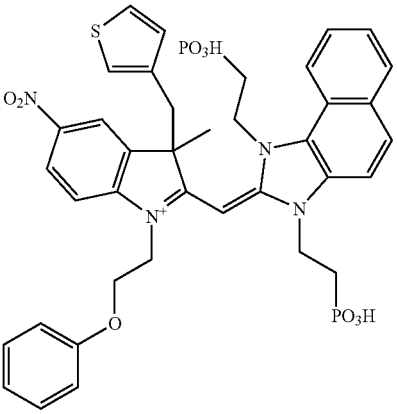
Cation No. 118B
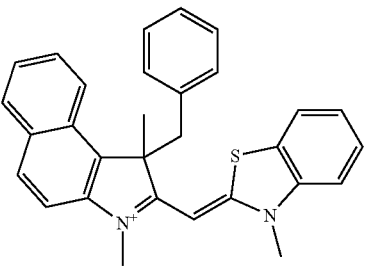

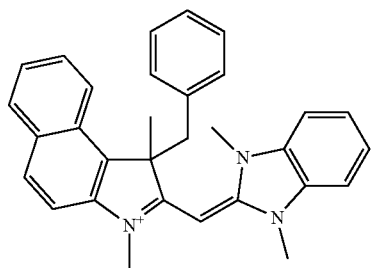
Cation No. 119B
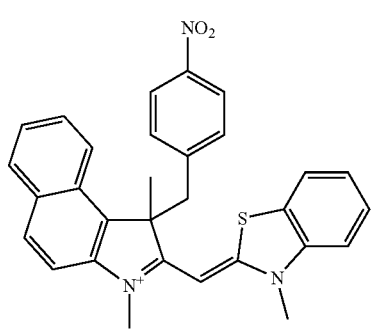
Cation No. 120B
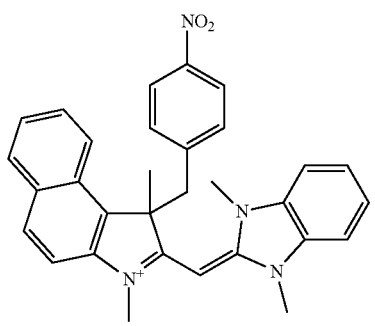
Cation No. 121A
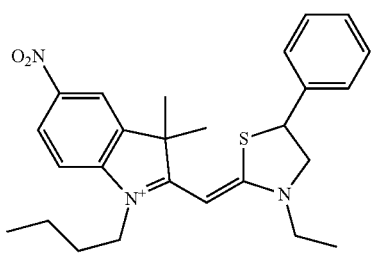
Cation No. 122A
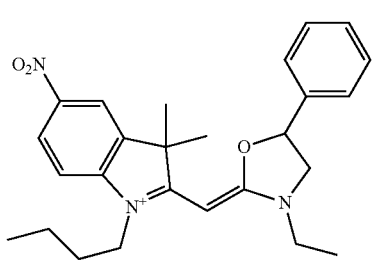
Cation No. 120C
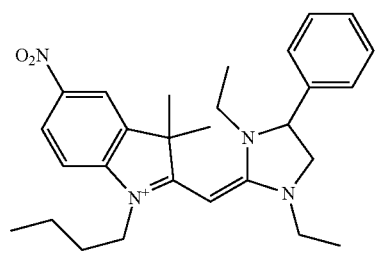
Cation No. 121B
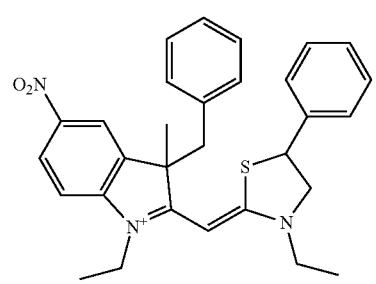
Cation No. 122B
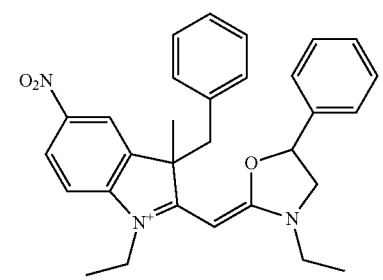
Cation No. 123
[Chem. 13-6]
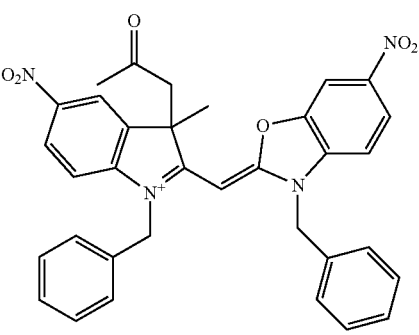
Cation No. 124
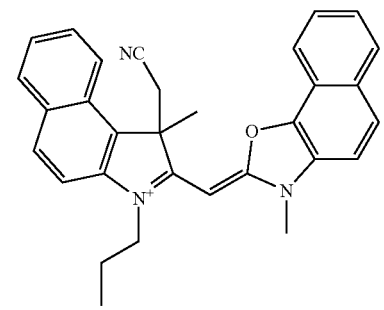
Cation No. 125

Cation No. 126
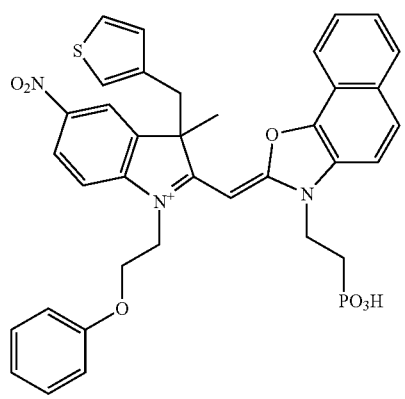
Cation No. 131
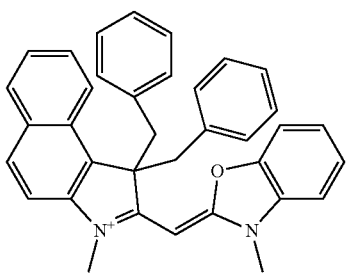
Cation No. 127
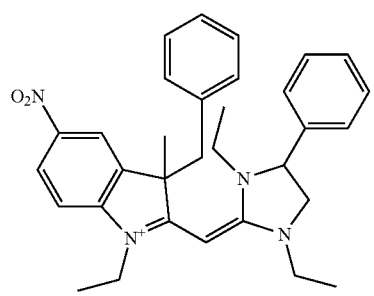
Cation No. 132
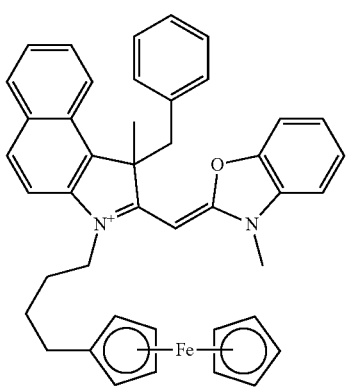
Cation No. 128
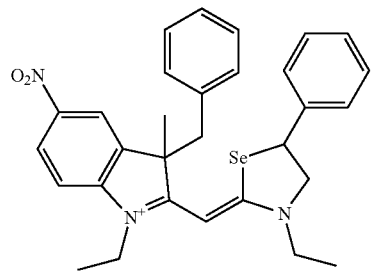
Cation No. 133
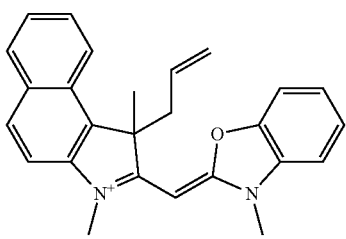
Cation No. 129
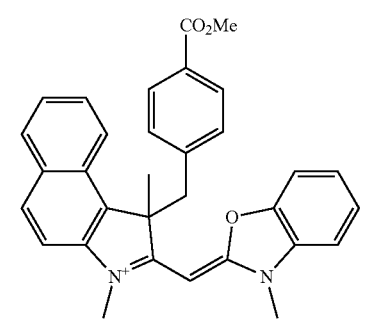
Cation No. 134
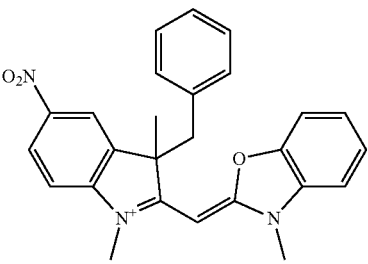
Cation No. 130
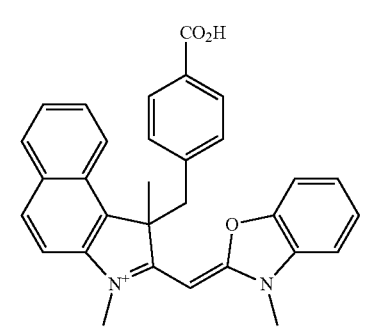
Cation No. 135
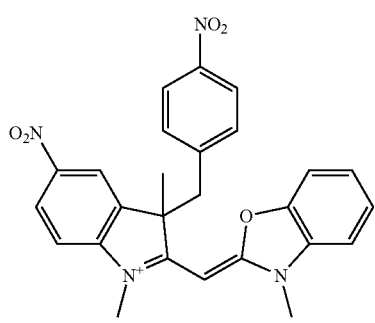

[Chem. 13-7]
Cation No. 136
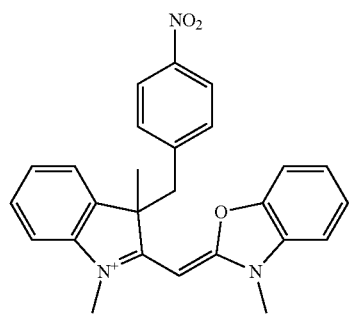
Cation No. 137
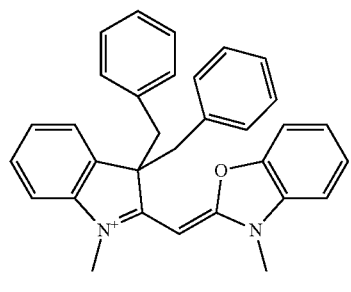
Cation No. 138
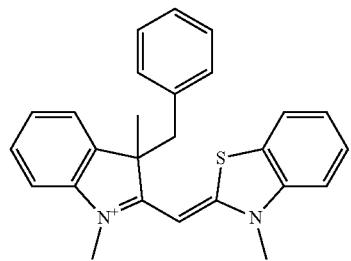
Cation No. 139
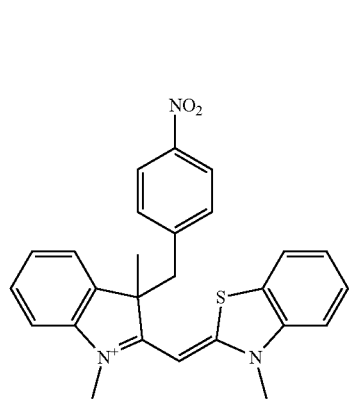
The monomethine cyanine cation (I) is not particularly limited by the process of preparation and may be obtained by any process known for synthesizing cyanine compounds.
Specific examples of the azomethine complex anion (IV) include anion Nos. 1 through 18 shown below.
[Chem. 14]
Anion No. 1
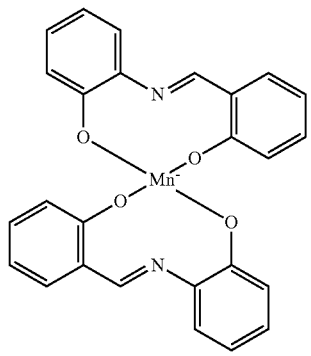
Anion No. 2
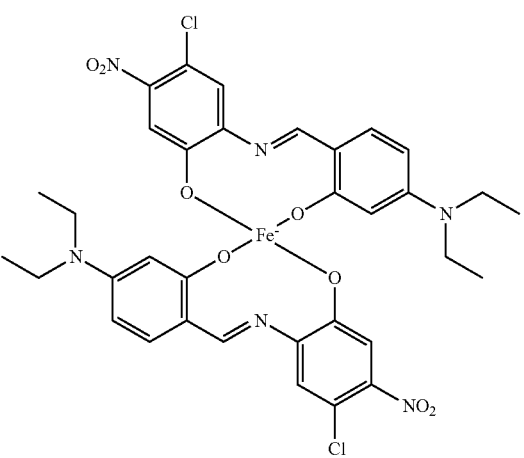
Anion No. 3
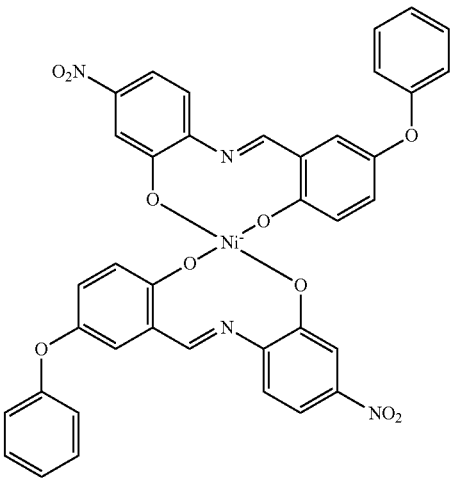

Anion No. 4
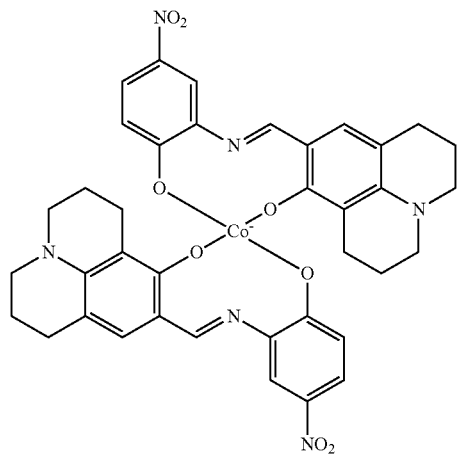
Anion No. 5
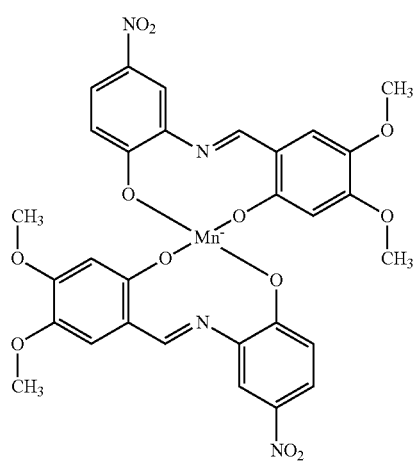
Anion No. 6
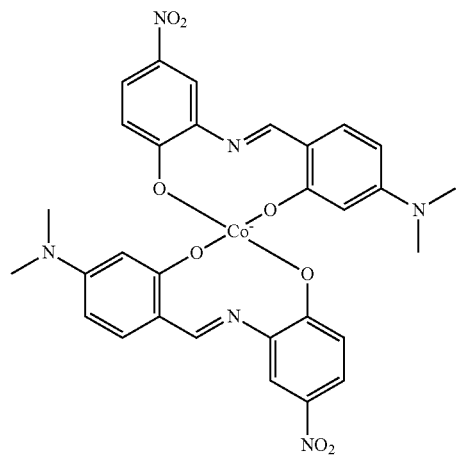
Anion No. 7
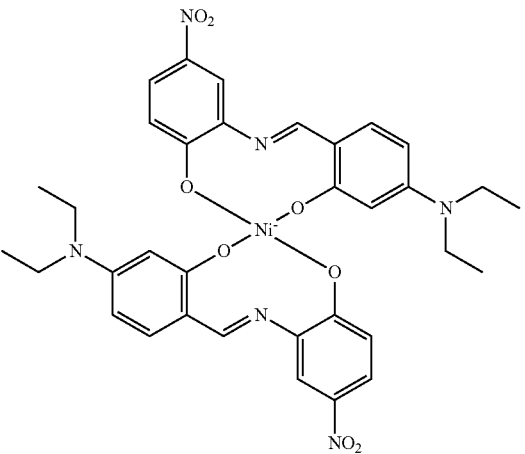
Anion No. 8
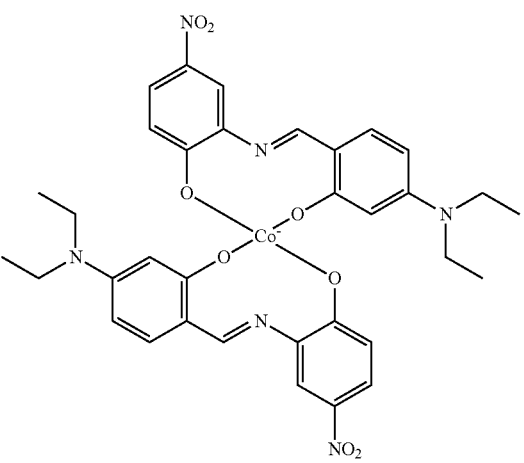
[Chem. 15]
Anion No. 9
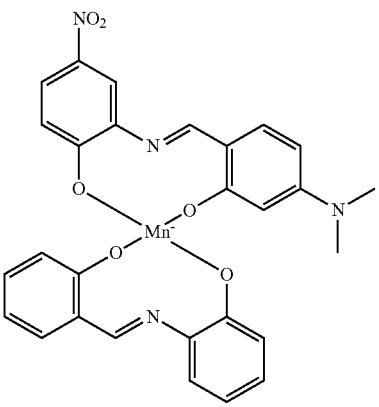

Anion No. 10
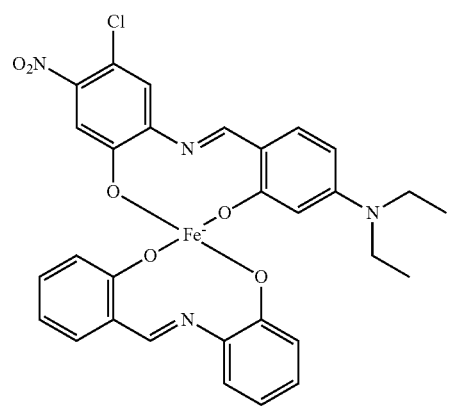
Anion No. 13
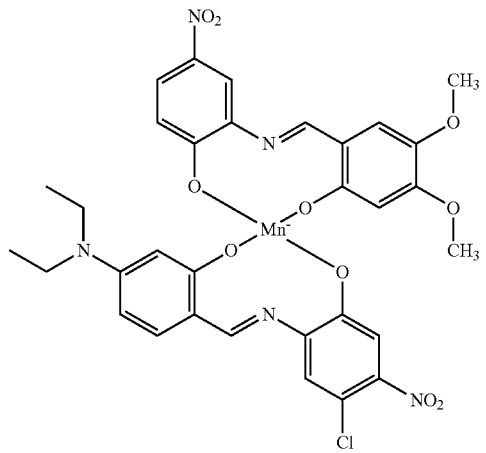
Anion No. 11
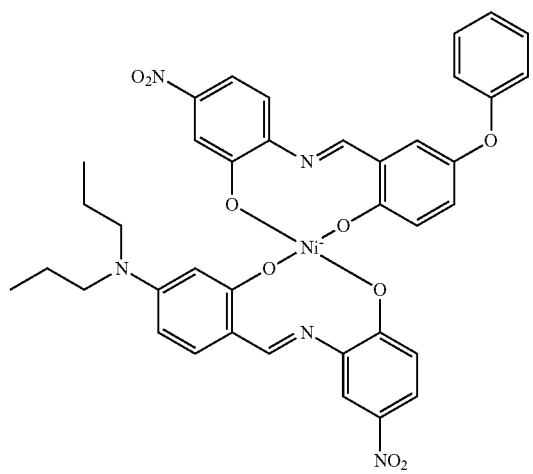
Anion No. 14
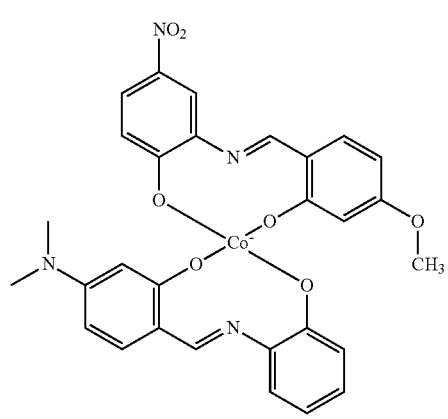
Anion No. 12
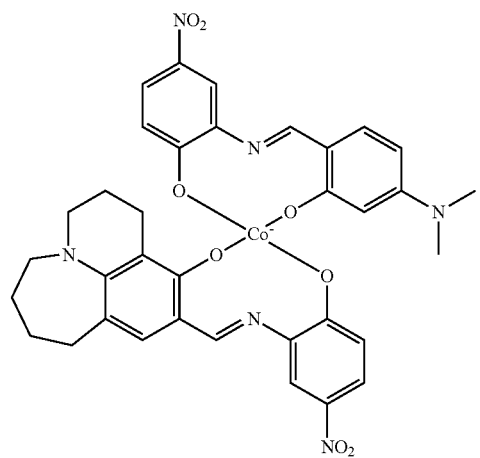
Anion No. 15
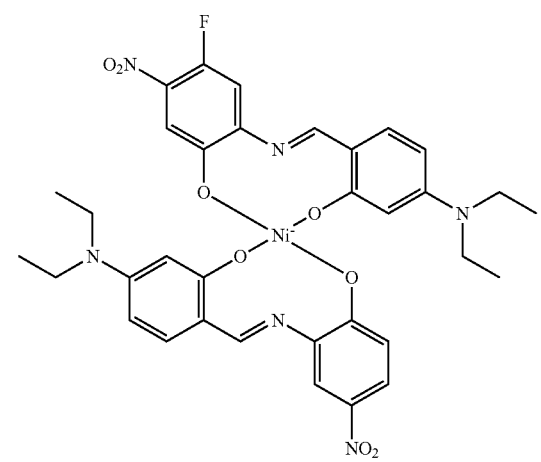

-continued

Anion No. 16

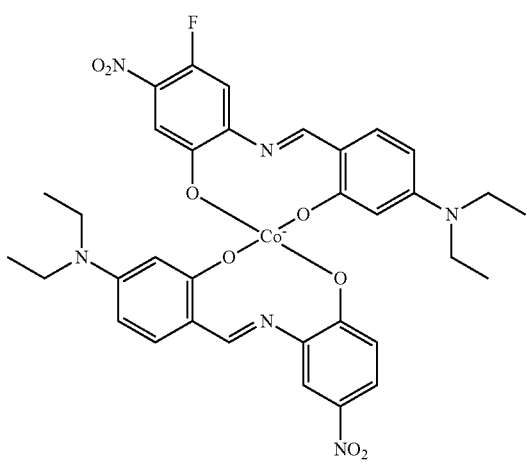

[Chem. 16]

Anion No. 17

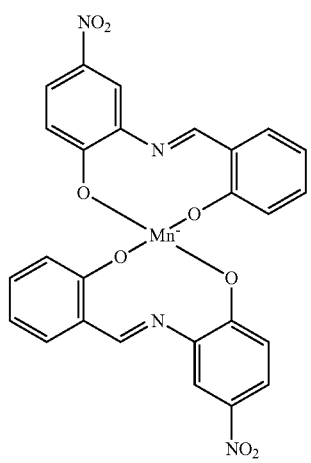

Anion No. 18

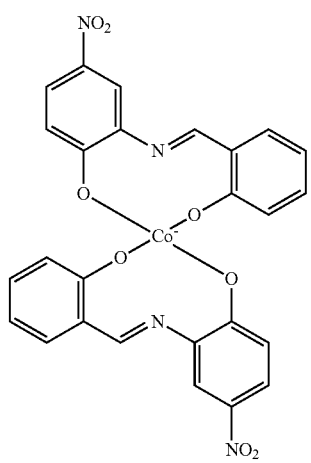

The azomethine complex anion (IV) is not particularly limited by the process of preparation and may be obtained by any process known for synthesizing azomethine compounds.

The organic salt compound of the invention is not particularly limited by the process of preparation. For example, the organic salt compound of the invention can be obtained by salt exchange reaction between a compound containing the monomethine cyanine cation (I) and a compound containing the azomethine complex anion (IV) in a solvent in a usual manner. Examples of useful compounds containing the monomethine cyanine cation (I) are compounds composed of the monomethine cyanine cation (I) and an anion such as $BF_4^-$, $PF_6^-$, or $SbF_6^-$. Examples of useful compounds containing the azomethine complex anion (IV) include compounds composed of the azomethine complex anion and a cation, such as an ammonium ion (e.g., trimethylammonium ion or trimethylammonium ion) or an alkali metal ion (e.g., $Na^+$, $Li^+$, or $K^+$).

The organic salt compound of the invention composed of the monomethine cyanine cation and the azomethine anion is suitable as an optical element responsive to light of wavelengths ranging from 380 nm to 1100 nm, preferably an optical element responsive to light of wavelengths ranging from 380 to 620 nm, more preferably an optical element responsive to light of wavelengths ranging from 380 to 450 nm. As used herein, the term "optical element" denotes an element that absorbs specific light to perform a function, including a light absorber, an optical recording agent, and a photosensitizer. For instance, an optical recording agent is used in an optical recording layer of optical recording media, such as BD-Rs.

The optical recording material of the invention which contains the organic salt compound of the invention will then be described. The optical recording material is used to form an optical recording layer on a substrate to provide an optical recording medium.

The organic salt compound of the invention is useful in an optical recording material used to form an optical recording layer of an optical medium on which information is written in the form of a thermal information pattern with a laser, etc. As used herein, the term "optical recording material" means a material used to form an optical recording layer, which refers to the organic salt compound of the invention and a mixture of the organic salt compound of the invention and, where needed, organic solvent and/or various compounds hereinafter.

The method of forming an optical recording layer of an optical recording medium using the optical recording material of the present invention containing the organic salt compound of the invention is not particularly limited. A wet coating technique is generally used, in which an optical recording material in the form of solution is applied to a substrate by spin coating, spraying, dipping or a like method. The optical recording material in the form of solution is prepared by dissolving the organic salt compound of the invention and, if necessary, various compounds described later in an organic solvent. Suitable organic solvents include lower alcohols, such as methanol and ethanol; ether alcohols, such as methyl cellosolve, ethyl cellosolve, butyl cellosolve, and butyl diglycol; ketones, such as acetone, methyl ethyl ketone, methyl isobutyl ketone, cyclohexanone, and diacetone alcohol; esters, such as ethyl acetate, butyl acetate, and methoxyethyl acetate; acrylic esters, such as ethyl acrylate and butyl acrylate; fluoroalcohols, such as 2,2,3,3-tetrafluoropropanol; hydrocarbons, such as benzene, toluene, and xylene; and chlorinated hydrocarbons, such as methylene dichloride, dichloroethane, and chloroform. The optical recording layer may also be formed by vacuum evaporation, sputtering, or a like technique. When in using the organic solvent, the amount of the organic solvent is preferably such that the concentration of the organic salt compound of the invention in the optical recording material of the invention is in the range of from 0.1% to 10% by mass.

The optical recording layer is formed as a thin film with a thickness usually of from 0.001 to 10 μm, preferably 0.01 to 5 μm.

The content of the organic salt compound of the invention in the optical recording material of the invention is preferably 10% to 100% by mass based on the solids content. The optical recording layer is preferably formed such that the content of the organic salt compound in the optical recording layer ranges from 50% to 100% by mass. Accordingly, it is more preferred for the optical recording material of the invention to contain 50% to 100% by mass of the organic salt compound based on the solids content to give the above-recited preferred organic salt compound content in the optical recording layer.

The term "solids content of the optical recording material of the invention" refers to the total amount of components other than non-solid components including an organic solvent. The solids content of the optical recording material is preferably 0.01% to 100% by mass, more preferably 0.1% to 10% by mass.

Where necessary, the optical recording material of the invention may contain, in addition to the organic salt compound of the invention, compounds commonly employed in an optical recording layer, such as cyanine compounds other than the organic salt compound of the invention, azo compounds, phthalocyanine compounds, oxonol compounds, squarylium compounds, indole compounds, styryl compounds, porphin compounds, azulenium compounds, croconic methine compounds, pyrylium compounds, thiopyrylium compounds, triarylmethane compounds, diphenylmethane compounds, tetrahydrocholine compounds, indophenol compounds, anthraquinone compounds, naphthoquinone compounds, xanthene compounds, thiazine compounds, acridine compounds, oxazine compounds, spiropyran compounds, fluorene compounds, and rhodamine compounds. The optical recording material may further contain resins, such as polyethylene, polyester, polystyrene, and polycarbonate; surfactants, antistatic agents, lubricants, flame retardants, radical scavengers (e.g., hindered amines), pit formation accelerators (e.g., ferrocene derivatives), dispersants, antioxidants, crosslinking agents, light resistance imparting agents, and so on. The optical recording material may furthermore contain an aromatic nitroso compound, an aluminum compound, an iminium compound, a bisiminium compound, a transition metal chelate compound, and the like as a quencher, e.g., for singlet oxygen. The content of these various compounds in the optical recording material is up to 50% by mass based on the solids content of the optical recording material of the invention.

The substrate on which the optical recording layer is provided may be of any material as long as it is substantially transparent to a write/read (recording/reproducing) light beam, including resins, such as polymethyl methacrylate, polyethylene terephthalate, and polycarbonate, and glass. The substrate may have any shape according to use, including a tape, a drum, a belt, and a disk.

A reflective layer of gold, silver, aluminum, copper, etc. may be formed on the optical recording layer by vacuum evaporation or sputtering. A protective layer may be formed using an organic material, such as an acrylic resin or a UV curing resin, or by sputtering using an inorganic material.

The optical recording material of the invention is suitable to make optical recording media that employ a semiconductor laser for writing and reading, particularly, known high-speed single-layer, dual-layer, or multi-layer optical discs, such as CD-Rs, DVD±Rs, HD-DVD-Rs, and BD-Rs.

EXAMPLES

The present invention will now be illustrated in greater detail with reference to Examples, but it should be understood that the invention is not construed as being limited thereto.

Examples 1 through 14 describe synthesis of the organic salt compounds of the invention. Examples 15 and 16 illustrate preparation of optical recording materials using the organic salt compounds obtained in Examples 1 and 2 and making of optical recording media using the resulting optical recording materials.

Comparative Examples 1 through 5 show examples of optical recording materials and optical recording media using organic salt compounds having an anion structure different from the azomethine complex anion according to the invention. Comparative Example 6 is an example of an optical recording material and an optical recording medium using an organic salt compound having a cation structure different from the monomethine cyanine cation according to the invention.

Example 1

Synthesis of Organic Salt Compound Composed of Cation No. 78 and Anion No. 8

A reaction flask having been purged with nitrogen was charged with 4 mmol of a $BF_4$ salt of cation No. 78, 4 mmol of a trimethylammonium salt of anion No. 8, and 9.16 g of dimethylformamide, and the mixture was heated up to 40° C. while stirring, and the stirring was continued at that temperature for 2 hours. To the reaction mixture was added dropwise 18.32 g of methanol, followed by cooling to room temperature. The solid thus precipitated was collected by filtration and dried to obtain 4.24 g (yield: 92.6%) of brown crystals, which were identified to be the desired organic salt compound composed of cation No. 78 and anion No. 8. The results of analyses on the resulting brown crystals are shown in Tables 1 to 3 below.

Examples 2 to 14

Synthesis of Organic Salt Compound Composed of Cation (I) and Anion No. 8

Organic salt compounds composed of cation (I) and anion No. 8 were synthesized in the same manner as in Example 1, except for replacing cation No. 78 with each of the cations shown in Table 1. The results of analyses on the resulting organic salt compounds are shown in Tables 1 to 3.

TABLE 1

| Example | Cation | $\lambda_{max}$ (nm) | $\epsilon$ (×10⁴) | DTA (° C.) | Decomp. Temp. (° C.) |
|---|---|---|---|---|---|
| 1 | No. 78 | 425 | 10.40 | 255 (endo), 261 (endo), 391 (exo) | 257 |
| 2 | No. 79 | 426 | 9.41 | 233 (end), 254 (exo), 392 (exo) | 252 |
| 3 | No. 129 | 425 | 9.71 | 261 (endo), 384 (exo) | 258 |
| 4 | No. 130 | 425 | 9.21 | 268 (endo), 389 (exo) | 264 |
| 5 | No. 132 | 426 | 9.99 | 250 (endo), 297 (exo), 377 (exo) | 249 |
| 6 | No. 131 | 428 | 9.77 | 243 (exo), 382 (exo) | 242 |
| 7 | No. 133 | 422 | 10.80 | 256 (endo), 263 (exo), 389 (exo) | 256 |
| 8 | No. 134 | 441 | 11.70 | 259 (endo), 391 (exo) | 259 |
| 9 | No. 135 | 433 | 11.10 | 263 (exo), 385 (exo) | 259 |
| 10 | No. 54 | 403 | 9.76 | 270 (exo), 393 (exo) | 268 |
| 11 | No. 136 | 403 | 10.20 | 272 (exo), 393 (exo) | 270 |
| 12 | No. 137 | 407 | 9.58 | 244 (endo), 267 (exo), 391 (exo) | 263 |
| 13 | No. 138 | 437 | 10.40 | 256 (exo), 379 (exo) | 250 |
| 14 | No. 139 | 437 | 10.30 | 263 (exo), 389 (exo) | 257 |

TABLE 2

| | IR absorption spectrum/cm$^{-1}$ |
|---|---|
| Example 1 | 3449, 2925, 1655, 1647, 1637, 1595, 1570, 1509, 1498, 1476, 1459, 1439, 1400, 1375, 1353, 1329, 1273, 1193, 1168, 1140, 1077, 961, 819, 803, 752, 708, 669, 648, 607, 564, 554 |
| Example 2 | 3435, 2967, 1594, 1570, 1516, 1498, 1479, 1438, 1402, 1374, 1345, 1329, 1281, 1197, 1169, 1141, 1080, 1014, 962, 807, 752, 708, 670, 654 |
| Example 3 | 3422, 3069, 2972, 2927, 1716, 1597, 1571, 1513, 1478, 1438, 1421, 1406, 1373, 1354, 1329, 1279, 1246, 1193, 1168, 1140, 1083, 1019, 962, 877, 854, 806, 789, 770, 752, 708, 670, 652, 608 |
| Example 4 | 3449, 2925, 1597, 1571, 1510, 1476, 1439, 1406, 1329, 1276, 1171, 1140, 1081, 971, 813, 777, 754, 708, 670, 652, 617 |
| Example 5 | 3435, 2925, 1596, 1570, 1510, 1479, 1439, 1406, 1355, 1272, 1168, 1141, 1080, 964, 817, 752, 707, 652, 607 |
| Example 6 | 3449, 2926, 1596, 1571, 1509, 1478, 1439, 1406, 1328, 1279, 1168, 1141, 1081, 818, 752, 703, 661, 607, 587 |
| Example 7 | 3435, 3066, 2964, 2926, 1596, 1570, 1517, 1479, 1407, 1371, 1356, 1342, 1326, 1279, 1247, 1195, 1170, 1139, 1083, 966, 920, 896, 876, 810, 787, 752, 738, 707, 677, 650, 607 |
| Example 8 | 3436, 2971, 1596, 1572, 1510, 1478, 1438, 1407, 1375, 1340, 1312, 1275, 1194, 1169, 1141, 1082, 960, 824, 752, 707, 651, 517 |
| Example 9 | 3435, 2969, 1596, 1577, 1514, 1478, 1438, 1407, 1374, 1342, 1312, 1275, 1194, 1168, 1141, 1123, 1082, 959, 853, 823, 751, 708, 651 |
| Example 10 | 3449, 2970, 1597, 1577, 1509, 1478, 1439, 1406, 1375, 1356, 1321, 1278, 1193, 1168, 1141, 1082, 1023, 962, 903, 892, 879, 856, 845, 521, 809, 796, 785, 773, 750, 726, 703, 690, 679, 667, 654, 631, 619, 607, 596, 583, 572, 560 |
| Example 11 | 3449, 1597, 1578, 1543, 1509, 1476, 1439, 1406, 1344, 1319, 1279, 1170, 1140, 1344, 1319, 1279, 1170, 1140, 1083, 754, 707, 671, 655 |
| Example 12 | 3449, 2925, 1598, 1577, 1509, 1491, 1477, 1439, 1406, 1317, 1283, 1171, 1141, 1083, 821, 747, 707, 650 |
| Example 13 | 3435, 2968, 1596, 1567, 1510, 1475, 1407, 1372, 1353, 1275, 1168, 1140, 1079, 822, 752, 707, 670, 652, 603 |
| Example 14 | 3435, 2969, 2927, 1596, 1567, 1513, 1475, 1407, 1373, 1345, 1275, 1245, 1168, 1141, 1081, 1020, 962, 853, 823, 753, 708, 651, 596 |

TABLE 3

| | $^1$H-NMR (DMSO-d6) |
|---|---|
| Ex. 1 | 0.99 ppm (12H, t), 2.13 ppm (3H, m), 3.23 ppm (8H, m), 3.46 ppm (3H, s), 3.91 ppm (1H, w), 3.96 ppm (3H, s), 4.24 ppm (1H, s), 5.63 ppm (2H, d), 5.75 ppm (1H, s), 6.07 ppm (2H, d), 6.40 ppm (2H, d), 6.47 ppm (2H, d), 6.80 ppm (2H, t), 6.91 ppm (1H, t), 7.44 ppm (3H, t), 7.58 ppm (3H, m), 7.73 ppm (3H, m), 7.80 ppm (1H, d), 7.99 ppm (2H, m), 8.06 ppm (1H, d), 8.43 ppm (1H, s), 8.87 ppm (2H, s), 8.94 ppm (2H, s) |
| Ex. 2 | 0.98 ppm (12H, t), 2.21 ppm (3H, m), 3.21 ppm (8H, m), 3.47pm (3H, s), 3.98 ppm (3H, s), 4.04pm (1H, w), 4.36ppm (1H, s), 5.60 ppm (2H, d), 5.72 ppm (1H, s), 6.07m (2H, d), 6.38pm (2H, d), 6.73 ppm (2H, w), 7.44 ppm (3H, m), 7.56 ppm (3H, m), 7.67 ppm (2H, m), 7.72 ppm (3H, m), 7.83 ppm (1H, d), 7.99pm (2H, m), 8.06pm (1H, d), 8.46pm (1H, w), 8.89 ppm (2H, s), 8.95 ppm (2H, s) |
| Ex. 3 | 1.02 ppm (12H, t), 2.20 ppm (3H, m), 3.21 ppm (8H, m), 3.45 ppm (3H, s), 3.68 ppm (3H, s), 3.96-3.99 ppm (4H, m), 4.30 ppm (1H, w), 5.61 ppm (2H, d), 5.70 ppm (1H, s), 6.07 ppm (2H, d), 6.38 ppm (2H, d), 6.59 ppm (2H, w), 5.70 (1H, w), 7.37-7.46 ppm (5H, m), 7.53-7.62 ppm (3H, m), 7.72-7.83 (4H, m), 7.96-7.86 ppm (2H, m), 8.44 ppm (1H, w), 8.89 ppm (2H, s), 8.95 ppm (2H, s) |
| Ex. 4 | 0.98 ppm (12H, t), 2.19 ppm (3H, m), 3.20 ppm (8H, m), 3.45 ppm (3H, s), 3.96 ppm (4H, m), 5.65 ppm (2H, m), 6.08 ppm (2H, d), 6.40 ppm (2H, d), 6.56 ppm (2H, w), 6.80 ppm (2H, t), 7.34-8.06 ppm (15H, m), 8.46 ppm (1H, w), 8.93 ppm (2H, s), 8.95 ppm (2H, s) |
| Ex. 5 | 0.98 ppm (12H, t), 1.22 ppm (2H, m), 1.37 ppm (2H, m), 2.12 ppm (5H, m), 3.22 ppm (8H, m), 3.93-4.08 ppm (16H, m), 5.61 ppm (2H, s), 5.69 ppm (2H, w), 6.08 ppm (2H, m), 6.40 ppm (4H, m), 6.80 ppm (2H, m), 6.92 ppm (1H, m), 7.43-8.08 ppm (13H, m), 8.46 ppm (1H, ?), 8.88 ppm (2H, s), 8.95 ppm (2H, s) |
| Ex. 6 | 0.98 (12H, t), 3.23 (11H, m), 3.79 (1H, d), 4.08 (5H, m), 4.41 (1H, d), 5.61 (2H, d), 5.76-6.89 (15H, m), 7.22 (1H, m), 7.47-8.02 (12H, m), 8.73 (1H, m), 8.90 (2H, s), 8.96 (2H, s) |
| Ex. 7 | 0.97 (12H, t), 2.07 (3H, w), 3.30 (8H, m), 3.39 (2H, m), 3.73 (3H, s), 3.89 (1H, s), 4.59 (1H, dd), 4.73 (1H, d), 4.96 (1H, m), 5.61 (2H, s), 5.71 (1H, w), 6.06 (2H, dd), 6.40 (2H, d), 7.44-7.90 (10H, m), 7.88 (1H, d), 8.04 (2H, dd), 8.26 (1H, s), 8.89 (2H, s), 8.95 (2H, s) |
| Ex. 8 | 0.98 ppm (12H, t), 1.96 ppm (2H, s), 3.21 ppm (8H, m), 3.32 ppm (3H, s), 5.54 ppm (1H, d), 3.91 ppm (1H, w), 3.98 ppm (4H, s), 5.60 ppm (2H, d), 5.86 ppm (1H, s), 6.05 ppm (2H, d), 6.38 ppm (2H, d), 6.76 ppm (2H, d), 6.98 ppm (3H, m), 7.20 ppm (1H, d), 7.44 ppm (2H, d), 7.60 ppm (2H, m), 7.72 ppm (2H, d), 7.87 ppm (1H, d), 8.10 ppm (1H, d), 8.20 ppm (1H, d), 8.60 ppm (1H, s), 8.89 ppm (2H, s), 8.95 ppm (2H, s) |
| Ex. 9 | 0.98 (12H, t), 1.99 (3H, s), 3.30 (8H, q), 3.37 (5H, m), 3.76 (1H, d), 4.01-4.12 (4H, m), 5.61 (2H, d), 5.88 (1H, s), 6.06 (2H, dd), 6.40 (2H, d), 7.05 (2H, m), 7.23 (1H, m), 7.46 (2H, d), 7.62 (2H, m), 7.42 (2H, d), 7.86 (2H, d), 7.91 (1H, d), 8.13 (1H, d), 8.23 (1H, d), 8.70 (1H, s), 8.89 (2H, s), 8.95 (2H, s) |
| Ex. 10 | 0.98 (12H, t), 1.87 (3H, w), 3.20 (8H, q), 3.34-3.46 (4H, m), 3.92-3.97 (4H, m), 5.60-5.64 (3H, m), 6.07 (2H, dd), 6.40 (2H, d), 6.71 (2H, d), 6.98 (3H, m), 7.10 (1H, d), 7.28 (2H, td), 7.45 (2H, d), 7.55 (2H, td), 7.66 (1H, d), 7.73 (2H, dd), 7.80 (1H, d), 8.00 (1H, w), 8.89 (2H, s), 8.96 (2H, s) |

TABLE 3-continued

| | $^1$H-NMR (DMSO-d6) |
|---|---|
| Ex. 11 | 0.98 (12H, t), 2.08 (3H, w), 3.21 (8H, q), 3.28-3.46 (3H, m), 3.46 (1H, d), 3.94 (3H, s), 4.13 (1H, d), 5.61 (2H, d), 5.67 (1H, w), 6.09 (2H, dd), 6.40 (2H, d), 7.01 (2H, d), 7.11 (1H, d), 7.27 (2H, m), 7.47 (2H, d), 7.53 (2H, td), 7.78 (6H, dd), 8.01 (1H, w), 8.89 (2H, s), 8.96 (2H, s) |
| Ex. 12 | 0.98 (12H, t), 3.13 (3H, m), 3.23 (8H, q), 3.64 (2H, d), 3.95 (2H, s), 4.15 (2H, m), 5.61 (2H, d), 5.68 (1H, s), 6.08 (2H, dd), 6.39 (2H, d), 6.73 (2H, d), 6.77 (2H, dd), 6.91-7.00 (7H, m), 7.23 (2H, td), 7.45 (2H, d), 7.59 (2H, td), 7.34 (2H, dd), 7.81-7.86 (2H, m), 8.12 (1H, d), 8.95 (2H, s), 8.96 (2H, s) |
| Ex. 13 | 0.98 (12H, t), 1.76 (3H, w), 3.24-3.41 (13H, m), 4.07 (3H, s), 5.60 (2H, d), 6.07 (2H, dd), 6.26 (1H, w), 6.40 (2H, d), 6.68 (2H, d), 6.96-7.11 (4H, m), 7.28 (2H, td), 7.47 (2H, d), 7.55 (1H, dd), 7.65-7.75 (4H, m), 7.96 (1H, d), 8.15 (1H, d), 8.89 (2H, s), 8.96 (2H, s) |
| Ex. 14 | 0.98 (12H, t), 1.79 (3H, w), 3.20-3.36 (H,), 3.36 (2H, d), 4.11 (3H, s), 5.61 (2H, d), 6.08 (2H, dd), 6.33-6.40 (3H, m), 6.94 (2H, d), 7.11 (1H, d), 7.32 (2H, td), 7.46 (2H, d), 7.57 (1H, dd), 7.73 (4H, m), 7.85 (2H, d), 8.01 (1H, d), 8.16 (1H, d), 8.95 (2H, s), 8.96 (2H, s) |

Example 15

Making Optical Recording Material and Optical Recording Medium

The organic salt compound obtained in Example 1 was dissolved in 2,2,3,3-tetrafluoropropanol to prepare a 1.0 mass % solution as an optical recording material. The resulting optical recording material was applied to a polycarbonate disc by spin coating at 2000 rpm for 60 seconds to form an optical recording layer. The resulting optical recording medium was designated optical recording medium No. 1.

Example 16

An optical recording material was prepared, and optical recording medium No. 2 was made using the optical recording material in the same manner as in Example 15, except for replacing the organic salt compound of Example 1 with the organic salt compound of Example 2.

Comparative Examples 1 to 6

Optical recording materials were prepared, and comparative optical recording medium Nos. 1 to 6 were made using the optical recording materials in the same manner as in Example 15, except for replacing anion No. 8 with each of the anions shown in Table 4 in Comparative Examples 1 to 5 and replacing cation No. 78 with the cation shown in Table 4 in Comparative Example 6. In Table 4 et seq., ORM stands for "optical recording medium".

TABLE 4

| | Salt Compound | | Optical Recording Medium |
|---|---|---|---|
| | Cation | Anion | (ORM) |
| Example 15 | cation No. 78 | anion No. 8 | ORM No. 1 |
| Example 16 | cation No. 79 | anion No. 8 | ORM No. 2 |
| Comp. Example 1 | cation No. 78 | $BF_4^-$ | Comp. ORM No. 1 |
| Comp. Example 2 | cation No. 78 | $ClO_4^-$ | Comp. ORM No. 2 |
| Comp. Example 3 | cation No. 78 | $PF_6^-$ | Comp. ORM No. 3 |
| Comp. Example 4 | cation No. 78 | $(CF_3SO_2)_2N^-$ | Comp. ORM No. 4 |
| Comp. Example 5 | cation No. 78 | comparative anion No. 1 | Comp. ORM No. 5 |
| Comp. Example 6 | comparative cation No. 1 | anion No. 8 | Comp. ORM No. 6 |

[Chem. 17]

Comparative Cation No. 1

Comparative Anion No. 1

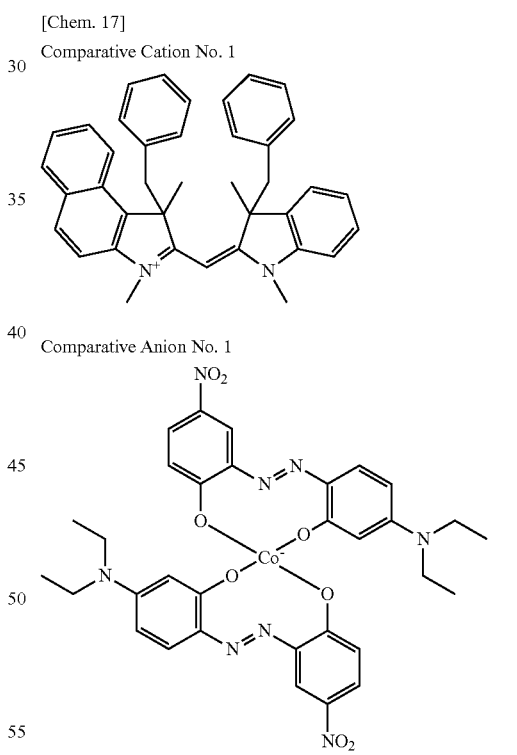

Light-Resistance Test:

Each of the optical recording media and the comparative optical recording media was irradiated with 22000 lux light for 200 hours. The UV absorption spectra of the media were measured before and after the irradiation to compare the absorbance at 405 nm. The ratio of the absorbance after the irradiation to that before the irradiation taken as 100 was calculated to obtain an absorbance retention. The results obtained are shown in Table 5 below.

TABLE 5

| Optical Recording Medium (ORM) | Absorbance Retention (%) after 200 hr Irradiation |
|---|---|
| ORM No. 1 | 84.7 |
| ORM No. 2 | 82.3 |
| Comp. ORM No. 1 | 0.0 |
| Comp. ORM No. 2 | 0.0 |
| Comp. ORM No. 3 | 0.0 |
| Comp. ORM No. 4 | 0.0 |

Optical recording medium Nos. 1 and 2 using the organic salt compounds according to the present invention have a high absorbance retention even after 200 hour irradiation, proving that the organic salt compounds of the invention are suitable for use in optical recording media. In contrast, the organic salt compounds used in Comparative Examples show an absorbance retention of 0% after 200 hour irradiation, proving poor in light resistance. It is now obvious from these results that the present invention provides excellent light resistance required for optical recording media.

Sensitivity Test:

The UV absorption spectrum of the resulting optical recording media and comparative optical recording media was determined to obtain an absorbance (Abs) at 405 nm. The results are shown in Table 6. The $\lambda_{max}$ of the UV absorption spectra and absorbances at $\lambda_{max}$ are also shown.

TABLE 6

| | $\lambda_{max}$ (nm) | Abs | Abs at 405 nm |
|---|---|---|---|
| ORM No. 1 | 432 | 0.427 | 0.360 |
| ORM No. 2 | 436 | 0.403 | 0.335 |
| Comp. ORM No. 1 | 426 | 0.385 | 0.309 |
| Comp. ORM No. 2 | 427 | 0.373 | 0.290 |
| Comp. ORM No. 3 | 426 | 0.336 | 0.269 |
| Comp. ORM No. 5 | 438 | 0.351 | 0.268 |
| Comp. ORM No. 6 | 513 | 0.332 | 0.134 |

Optical recording medium No. 1 using the organic salt compound of the invention exhibits high absorption, i.e., high sensitivity at 405 nm. Optical recording medium No. 2 also proves to have good sensitivity. In contrast, the comparative optical recording media have low sensitivity with low absorption at 405 nm. It is apparent from all these results that the optical recording medium of the invention is excellent in sensitivity and suitable to high speed recording.

The invention claimed is:

1. An organic salt compound consisting of a monomethine cyanine cation represented by formula (I) and an azomethine complex cation represented by formula (IV):

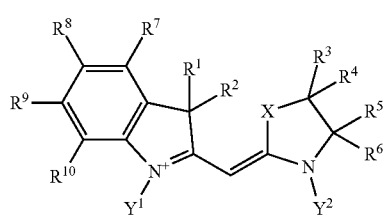

(I)

wherein X represents an oxygen atom, sulfur atom, a selenium atom, or —NY³—;

R⁴ and R² each independently represent a group represented by formula (II) shown below, a group represented by formula (II') shown below, an alkyl group having 1 to 20 carbon atoms, an aryl group having 6 to 30 carbon atoms, or an arylalkyl group having 7 to 30 carbon atoms, and R¹ and R² may be taken together to form a 3- to 6-membered alicyclic group;

R³, R⁴, R⁵, and R⁶ each independently represent a hydrogen atom, an alkyl group having 1 to 20 carbon atoms, an aryl group having 6 to 30 carbon atoms, or an arylalkyl group having 7 to 30 carbon atoms, and R⁴ and R⁵ may be taken together to form a 6-membered ring;

Y¹, Y², and Y³ each independently represent an alkyl group having 1 to 20 carbon atoms, an aryl group having 6 to 30 carbon atoms, or an arylalkyl group having 7 to 30 carbon atoms, or a group represented by formula (III) shown below;

R⁷, R⁸, R⁹, and R¹⁰ each independently represent a hydrogen atom, a hydroxyl group, an alkyl group having 1 to 20 carbon atoms, an aryl group having 6 to 30 carbon atoms, an arylalkyl group having 7 to 30 carbon atoms, a halogen atom, a nitro group, or a cyano group, and adjacent two of R⁷, R⁸, R⁹, and R¹⁰ may be taken together to form a 5- or 6-membered ring; and a methylene moiety of the alkyl groups and the arylalkyl groups may be interrupted by —O—, —S—, —CO—, —COO—, —OCO—, —SO₂—, —NH—, —CONH—, —NHCO—, —N=CH—, or —CH=CH—;

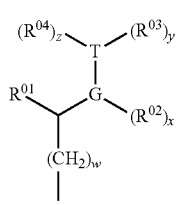

(II)

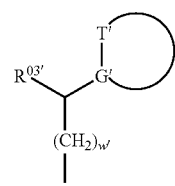

(II')

wherein, in formula (II), the bond between G and T is a double bond, a conjugated double bond, or a triple bond; G represents a carbon atom; T represents a carbon atom, an oxygen atom, or a nitrogen atom; w represents a number from 0 to 4; x, y, and z each represent, 0 or 1, provided that, when T is oxygen, y=z=0, and, when T is nitrogen, y+z=0 or 1; R⁰¹, R⁰², R⁰³, and R⁰⁴ each independently represent a hydrogen atom, a hydroxyl group, a nitro group, a cyano group, a halogen atom, or an optionally substituted alkyl group having 1 to 4 carbon atoms of which a methylene moiety may be interrupted by —O— or —CO—; and R⁰¹ and R⁰⁴ may be taken together to form a cycloalkene ring or a heterocyclic ring; and in formula (II'), the bond between G' and T' is a double bond or a conjugated double bond; G' represents a carbon atom; T' represents a carbon atom or a nitrogen atom; w' represents a number of 0 to 4; R⁰¹' represented a hydrogen atom, a hydroxyl group, a nitro group, a cyano group, a halogen atom, an optionally substituted alkyl group having 1 to 4 carbon atoms of which a methylene moiety may be interrupted by —O— or —CO—; and the ring containing G' and T' is a 5-membered ring optionally containing a hetero atom, a 6-membered ring optionally containing a hetero atom, a quinoline ring, an isoquinoline ring, or an anthraquinone ring, each optionally substituted with a halogen atom, a hydroxyl group, a nitro group, a cyano group, an alkyl group having 1 to 4 carbon atoms, or an alkoxy group having 1 to 4 carbon atoms;

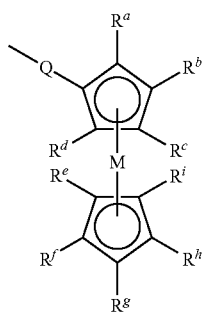

(III)

wherein $R^a$, $R^b$, $R^c$, $R^d$, $R^e$, $R^f$, $R^g$, $R^h$, and $R^i$ each independently represent a hydrogen atom or an alkyl group having 1 to 4 carbon atoms of which a methylene moiety may be interrupted by —O— or —CO—; Q represents a direct bond or an optionally substituted alkylene group having 1 to 8 carbon atoms of which a methylene moiety may be interrupted by —O—, —S—, —CO—, —COO—, —OCO—, —SO$_2$—, —NH—, —CONH—, —NHCO—, —N=CH—, or —CH=CH—; and M represents Fe, Co, Ni, Ti, Cu, Zn, Zr, Cr, Mo, Os, Mn, Ru, Sn, Pd, Rh, Pt, or Ir;

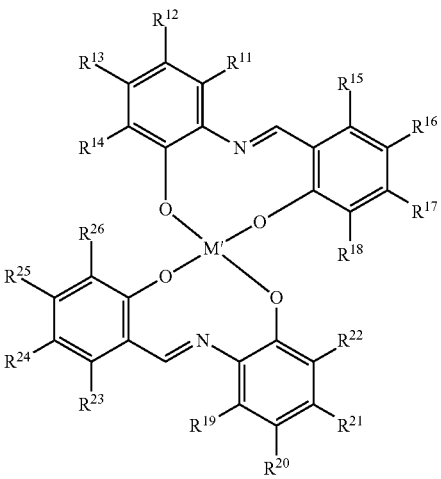

(IV)

wherein M' represents Fe, Co, Ni, Cu, Cr, Mo, Os, Mn, Ru, Sn, Pd, Rh, Pt, Al, or Ir; $R^{11}$, $R^{12}$, $R^{13}$, R $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, and $R^{26}$ each independently represent a hydrogen atom, a halogen atom, an alkyl group having 1 to 20 carbon atoms, an aryl group having 6 to 30 carbon atoms, an arylalkyl group having 7 to 30 carbon atoms, a nitro group, a cyano group, or —NRR'; R and R' each represent an alkyl group having 1 to 4 carbon atoms; and any adjacent two of $R^{11}$ through $R^{26}$ may be taken together to form a 5- or 6-membered ring.

2. An optical recording material comprising at least one organic salt compound according to claim 1.

3. An optical recording medium comprising an optical recording layer formed of the optical recording material according to claim 2.

* * * * *